United States Patent
Fountain et al.

(10) Patent No.: US 10,645,945 B2
(45) Date of Patent: May 12, 2020

(54) METHODS AND DEVICES FOR FORMING BEVERAGES FROM POWDERS WITH ENHANCED DISPERSIBILITY

(75) Inventors: Gerald Olean Fountain, Wilmette, IL (US); Philip James Oxford, Chicago, IL (US); Amy L. Penner, Chicago, IL (US)

(73) Assignee: Intercontinental Great Brands LLC, East Hanover, NJ (US)

(*) Notice: Subject to any disclaimer, the term of this patent is extended or adjusted under 35 U.S.C. 154(b) by 994 days.

(21) Appl. No.: 13/810,617

(22) PCT Filed: Jul. 15, 2011

(86) PCT No.: PCT/US2011/044238
§ 371 (c)(1),
(2), (4) Date: Apr. 29, 2013

(87) PCT Pub. No.: WO2012/009668
PCT Pub. Date: Jan. 19, 2012

(65) Prior Publication Data
US 2013/0209622 A1 Aug. 15, 2013

Related U.S. Application Data

(60) Provisional application No. 61/365,267, filed on Jul. 16, 2010.

(51) Int. Cl.
*A23F 5/36* (2006.01)
*A23F 5/40* (2006.01)
(Continued)

(52) U.S. Cl.
CPC ............... *A23F 5/36* (2013.01); *A23F 5/405* (2013.01); *A23G 1/00* (2013.01); *A23G 1/56* (2013.01);
(Continued)

(58) Field of Classification Search
CPC ............ A23F 5/36; B65D 85/804; A23G 1/56
(Continued)

(56) References Cited

U.S. PATENT DOCUMENTS 3,227,558 A * 1/1966 Richmond .................... 426/285
3,625,704 A    12/1971 Andre et al.
(Continued)

FOREIGN PATENT DOCUMENTS

EP    0220889 A2    5/1987
EP    0560609       9/1993
(Continued)

OTHER PUBLICATIONS

Dairy NPL.*
(Continued)

*Primary Examiner* — Erik Kashnikow
*Assistant Examiner* — Preston Smith
(74) *Attorney, Agent, or Firm* — Fitch, Even, Tabin & Flannery LLP

(57) ABSTRACT

A method and apparatus is provided for forming at least a portion of a beverage from a co-milled powdered composition. An amount of a co-milled powdered composition is combined with a fluid to produce at least a portion of a beverage. The co-milled powdered composition is obtained from co-milling together at least one powdered ingredient having a difficult to disperse or dissolve portion with one or more dispersion facilitator components to form a co-milled powder effective to enhance the dispersion or dissolving of the powder when forming a food or beverage.

11 Claims, 16 Drawing Sheets

(51) Int. Cl.
  *A23G 1/00* (2006.01)
  *A23L 2/39* (2006.01)
  *B65D 85/804* (2006.01)
  *A23G 1/56* (2006.01)

(52) U.S. Cl.
  CPC ............ *A23L 2/39* (2013.01); *B65D 85/8043* (2013.01); *B65D 85/8046* (2013.01)

(58) Field of Classification Search
  USPC ................. 426/115, 590, 596, 130, 431, 443
  See application file for complete search history.

(56) References Cited

U.S. PATENT DOCUMENTS

| | | | |
|---|---|---|---|
| 3,652,292 | A | 3/1972 | Bach et al. |
| 3,706,572 | A * | 12/1972 | Einsman ............... A23C 11/08 |
| | | | 426/285 |
| 3,939,289 | A | 2/1976 | Hornyak et al. |
| 4,594,257 | A | 6/1986 | Leblanc et al. |
| 4,594,258 | A | 6/1986 | Vitti et al. |
| 4,865,863 | A | 9/1989 | Prosise et al. |
| 4,934,608 | A | 6/1990 | Sylla et al. |
| 5,085,876 | A | 2/1992 | Tsau |
| 5,232,724 | A | 8/1993 | Aldcroft et al. |
| 5,264,228 | A | 11/1993 | Pray et al. |
| 5,441,753 | A | 8/1995 | McGinley et al. |
| 5,462,761 | A | 10/1995 | McGinley et al. |
| 5,554,400 | A | 9/1996 | Stipp |
| 5,736,177 | A | 4/1998 | McGinley et al. |
| 6,117,474 | A | 9/2000 | Kameda et al. |
| 6,207,203 | B1 * | 3/2001 | Atkinson ................. A23F 5/40 |
| | | | 426/594 |
| 6,287,616 | B1 | 9/2001 | Beeson et al. |
| 6,416,799 | B1 | 7/2002 | Porzio et al. |
| 6,521,278 | B1 | 2/2003 | Kaiser et al. |
| 6,777,014 | B2 | 8/2004 | Singh |
| 7,309,506 | B2 | 12/2007 | Amador |
| 7,651,718 | B2 | 1/2010 | Singh |
| 7,824,728 | B2 | 11/2010 | Bakkene et al. |
| 7,842,327 | B2 | 11/2010 | Hiramoto et al. |
| 2004/0182250 | A1 * | 9/2004 | Halliday et al. ................ 99/279 |
| 2004/0234665 | A1 | 11/2004 | Singh |
| 2005/0132893 | A1 | 6/2005 | Arora et al. |
| 2006/0257491 | A1 | 11/2006 | Morton et al. |
| 2007/0292576 | A1 | 12/2007 | Dollat et al. |
| 2007/0292577 | A1 | 12/2007 | Kopp et al. |
| 2008/0044516 | A1 | 2/2008 | Dollat et al. |
| 2009/0092727 | A1 | 4/2009 | Perlman |
| 2010/0021613 | A1 | 1/2010 | Singh |
| 2010/0028495 | A1 | 2/2010 | Novak et al. |
| 2010/0136183 | A1 | 6/2010 | Gonus et al. |

FOREIGN PATENT DOCUMENTS

| | | |
|---|---|---|
| EP | 0928561 A1 | 7/1999 |
| EP | 1627688 A1 | 2/2006 |
| EP | 1623633 A3 | 3/2006 |
| EP | 1631151 | 3/2006 |
| EP | 1733628 A1 | 12/2006 |
| EP | 1733811 A1 | 12/2006 |
| EP | 1802398 A1 | 7/2007 |
| EP | 1811861 A1 | 8/2007 |
| EP | 1814404 A1 | 8/2007 |
| EP | 1733624 B1 | 8/2008 |
| EP | 1733625 B1 | 8/2008 |
| FR | 2406956 | 5/1979 |
| GB | 105572 A | 4/1918 |
| GB | 1055772 A | 1/1967 |
| GB | 1060178 | 3/1967 |
| GB | 1141552 | 1/1969 |
| GB | 2006603 A | 5/1979 |
| GB | 2022394 | 12/1979 |
| GB | 1564094 | 4/1980 |
| RU | 2253252 C1 | 6/2005 |
| RU | 2299666 C2 | 5/2007 |
| WO | WO2005058073 | 6/2005 |
| WO | WO2010005604 A1 | 1/2010 |

OTHER PUBLICATIONS

International Preliminary Report on Patentability, dated Jan. 22, 2013 for PCT/US2011/044238 (1 pg.).
Written Opinion of the International Searching Authority, dated Jan. 22, 2013 for PCT/US2011/044238 (4 pgs.).
Extended European Search report dated Oct. 15, 2013, for European Patent Application No. 13185230.3 (5 pages).
First Office Action dated Nov. 27, 2013 for Chinese Patent Application No. 201180044699.6 (29 pages).
Chinese Publication entitled "Food Technology on Livestock Product," Jiang Aimin et al., pp. 128-130, China Agricultural Press, Feb. 2008 (5 pages).
Office Action dated Jun. 16, 2015 for Russian Patent Application No. 2013103207, with English translation (11 pgs.).
Office Action dated Oct. 1, 2015 for Ukrainian Patent Application No. a201301699, English translation (3 pgs.).
Office Action dated Oct. 9, 2015 for Russian Patent Application No. 2013103207, English translation (5 pgs.).
International Search Report and Written Opinion for PCT/US2011/044238 dated Sep. 13, 2011.

* cited by examiner

METHODS AND DEVICES FOR FORMING BEVERAGES FROM POWDERS WITH ENHANCED DISPERSIBILITY

CROSS REFERENCE TO RELATED APPLICATIONS

This application is a U.S. national phase application of International Application No. PCT/US2011/044238 filed Jul. 15, 2011, designating the United States, which claims benefit of U.S. Provisional Application No. 61/365,267, filed Jul. 16, 2010, both of which are hereby incorporated herein by reference their entirety.

FIELD

The present application relates to methods and devices for forming beverages or portions of beverages from powders and processes for forming the powders. In particular, it relates to methods for forming beverages from powders obtained by processes effective to enhance the dispersibility of the powders.

BACKGROUND

Powdered or dried food and beverage products or intermediates ("powders"), such as beverage drinks, instant hot chocolate, chocolate intermediates, freeze-dried and spray-dried instant coffee, and powdered sauces, such as powdered cheese sauces, are well known. These powders are formed by a variety of processes. For example, instant coffees may be formed by deriving a liquid coffee concentrate intermediate (commonly known as coffee liquor) from coffee beans by the well known processes of roasting and extraction. Optionally, the coffee concentrate may be aromatized by the addition of coffee aromas stripped from an extracted coffee intermediate, again as well known in the art. The coffee concentrate is then subjected to various foaming and drying steps to produce a dry granular end product that can be reconstituted into a coffee beverage by the addition of hot water. Food powders are popular with consumers as they provide an economical, fast and simple way of preparing a food product or beverage. Powders are also used in manufacturing processes as intermediate ingredients that are hydrated with fluids and optionally mixed with other ingredients and subjected to further processing to form food and beverage products that are sold to consumers.

However, many available powders suffer from several drawbacks. One problem with current food and beverage powders is that when they are combined with a fluid, such as hot water, they tend to clump together and not evenly disperse throughout the fluid. Poor dispersion can lead to clumping of the particles in addition to non-hydrated regions of powder which never fully 'wet'. For example, upon adding the powder to the fluid, the powder will often agglomerate and float to the top of the fluid or sink to the bottom in a clump rather than disperse into the fluid.

The consumer is often required to wait a sufficient amount of time, often several minutes, for the clump of powder to sufficiently disperse into the fluid before consuming the food product or beverage. Alternatively, it may become necessary for the consumer to vigorously stir or shake the fluid to disrupt the clump and disperse the powder throughout the fluid. Even after the consumer waits a sufficient amount of time and/or shakes or stirs the fluid to disperse the powder, the powder may not entirely disperse into the fluid, and instead may form smaller clumps throughout the fluid. Requiring the consumer to wait or stir a solution formed from combining a powder with a fluid is undesirable. In addition, in situations where the consumer cannot remove all of the clumps, particularly in the case of beverages such as instant coffee or hot chocolate, the food or beverage may exhibit poor consistency and gritty mouth feel properties that are undesirable to the consumer.

Similarly, in food or beverage manufacturing processes, such shortcomings may delay the processing and/or requiring additional mixing steps which can add expense and complexity to the production systems. Due to the propensity of the prior powders to agglomerate they tend to not be free flowing, which can render manufacturing difficult. Once common solution was to use starches, flow aids, and other emulsifiers to enhance dispersibility and flowability. Such additional ingredients are often undesired.

Another possible solution contemplated to increase flowability and dispersibility may be to decrease the particle size of the powders. However, in many types of powdered food and beverage products, decreasing particle size actually enhances these shortcomings and makes the agglomeration problems worse. In some cases, for example, the clumping or agglomeration of the powder typically increases in relation to the decreasing size of the powder particles. Many powders having a small particle size, e.g., a D90 below about 100 microns in size, often exhibit more agglomeration and clumping than powders having a larger particle size, e.g., above about 100 microns. In this regard, these powders may not adequately disperse into a fluid or may require additional time or effort to sufficiently disperse the powder into the fluid.

SUMMARY

In one approach, a method for forming at least a portion of a beverage from a co-milled powdered composition is provided herein. An amount of a co-milled powdered composition is combined with a fluid to produce at least a portion of a beverage. The co-milled powdered composition is obtained from co-milling together at least one powdered ingredient having a difficult to disperse portion with about 2 to about 90 percent of one or more dispersion facilitator components. The resulting co-milled powdered composition may have a d90 particle size of about 2 to about 150 microns and is effective to produce the beverage portion with about 2 to about 16 percent solids from the co-milled powdered composition dispersed within the beverage. It has been surprisingly and unexpectedly found that combining a co-milled powdered composition obtained in this manner with a fluid provides enhanced dispersion benefits as compared to powders formed with similar components that are formed by either not co-milling the components and simply mixing them together or formed by milling the components separately.

In another approach, a single serve beverage pod or cartridge includes a co-milled powdered composition and is provided for use with a beverage preparation machine. The single serve beverage pod or cartridge, according to this approach, is used for forming at least a portion of a beverage or an entire beverage via the beverage preparation machine. The single serve pod or cartridge includes a holding space sized to contain the co-milled powdered composition. The pod or cartridge contains at least one inlet and at least one outlet either formable in or already defined in the pod or cartridge. The inlet and outlet are provided for injecting a fluid into the holding space and for dispensing at least a beverage portion from the pod or cartridge. The co-milled powdered composition in the holding space includes at least one powdered ingredient having a difficult to disperse portion and about 2 to about 90 percent of one or more dispersion facilitator components. The ingredients are co-milled together to a d90 particle size of about 2 to about 150 microns and are effective to produce the at least a beverage portion with about 2 to about 16 percent solids from the co-milled powdered composition dispersed therein. It has been surprisingly and unexpectedly found that a single serve beverage pod including a co-milled powdered composition as described in this approach provides enhanced dispersion benefits into fluid flowing through the pod or cartridge and extraction from the cup. Pods or cartridges filled with powders as described herein provide superior extraction from the pod or cartridge than pods or cartridges filled with powders of the same compositions that are either formed by separately jet-milling the individual ingredients of the powders together or by simply mixing the native ingredients together to form a powder.

In yet another approach, a packaged powdered beverage product for mixing with a fluid to form at least a portion of a beverage is provided. The packaged powdered beverage product includes a package defining a compartment with a powdered composition therein. The powdered composition includes a co-milled powdered composition with at least one powdered ingredient that has a difficult to disperse portion and about 2 to about 90 percent of one or more dispersion facilitator components. The ingredients are co-milled together to a d90 particle size of about 2 to about 150 microns and are effective to produce the at least a beverage portion with about 2 to about 16 percent solids from the co-milled powdered composition dispersed in the beverage portion. The packaged powdered beverage product of this approach provides similar dispersion benefits as the approaches described above when mixed with a fluid.

In yet another approach, a method of preparing a co-milled powdered composition capable of preparing at least a portion of a beverage is provided. The method according to this approach includes introducing at least one powdered ingredient with a difficult to disperse portion and about 2 to about 90 percent of one or more dispersion facilitator components to a milling apparatus. The method also includes co-milling, in a sustained operation and at the same time, the at least one powdered ingredient and the one or more dispersion facilitator components to form the co-milled powdered composition with a d90 particle size of about 2 to about 150 microns. The co-milled powdered composition is effective to produce at least a portion of a beverage when the co-milled powdered composition is contacted with water. The resulting beverages have about 2 to about 16 percent solids from the co-milled powdered composition dispersed therein.

In yet another approach, the powdered beverage product consists essentially of a powdered ingredient with at least one difficult to disperse or dissolve portion and at least one dispersion facilitator component. In another approach, the powdered beverage product consists of a powdered ingredient with at least one difficult to disperse or dissolve portion and at least one dispersion facilitator components.

BRIEF DESCRIPTION OF THE DRAWINGS

FIG. 4b is a flow diagram illustrating a modification of the process of FIG. 4a;
FIG. 5b is a flow diagram illustrating a modification of the process of FIG. 5a.

DETAILED DESCRIPTION

Figure 1:
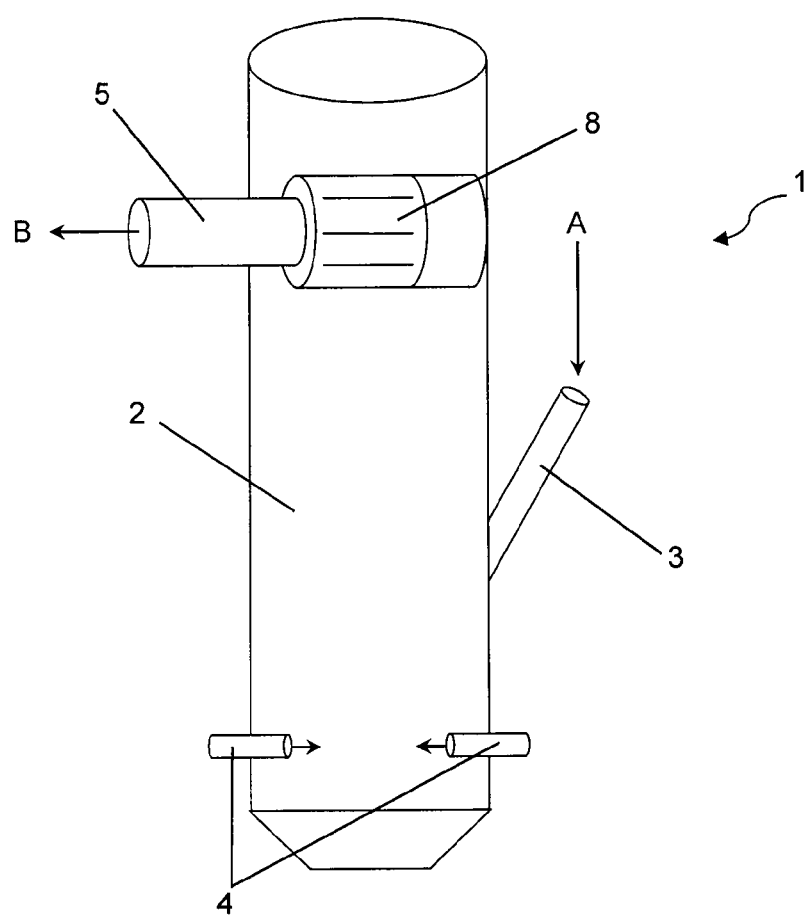
FIG. 1 is a schematic illustration of an exemplary jet mill.

Powders for mixing with fluids and other ingredients to form food or beverage products and methods of forming and using the food powders are generally disclosed. Upon mixing with a fluid, the powders may form a food or beverage product for consumption by a consumer, or the powders may form a food or beverage intermediate that requires additional processing and ingredients to form a final food or beverage product. In one aspect, the powders generally include two or more ingredients that are co-milled together. In another aspect, the co-milled powders include at least one powdered ingredient that has a difficult to disperse or dissolve portion and one or more dispersion or dissolving facilitator components.

Upon such co-milled powders being combined with to a fluid, the co-milled powders described herein will substantially completely dissolve and/or disperse throughout the fluid in a relatively short amount of time generally without requiring significant mixing or stirring by the consumer. If used in a beverage pod, disc, cartridge or the like for a single serve beverage machine, the powders will disperse and be substantially extracted from the pod. By one approach, the milling may be any dry or non-liquid milling approaches, such as jet mills and the like that process a dry powder.

In one approach, a method is provided for forming at least a portion of a beverage from a co-milled powdered composition. The method includes combining an amount of a co-milled powdered composition with a fluid to produce at least a portion of a beverage. The co-milled powdered composition is obtained from co-milling together at least one powdered ingredient having a difficult to dissolve or disperse portion thereof with by one approach 2 to 90 percent of one or more dispersion or dissolving facilitator components, by another approach about 2 to about 90 percent of one or more dispersion or dissolving facilitator components, and by another approach about 5 to about 50 percent of one or more dispersion or dissolving facilitator components to form the co-milled powdered composition with a d90 particle size of about 2 to about 150 microns in one approach, of 2 to 150 microns in another approach, and of about 5 to about 80 microns in another approach. The powdered composition is capable of producing the beverage portion with about 2 to about 16 percent solids from the co-milled powdered composition dispersed therein.

By one approach, the difficult to disperse portion of the powder includes a material that does not easily dissolve or disperse throughout a fluid when combined with the fluid. In another approach, the difficult to disperse portion of the powder is also not easily extracted from a pod, disc, cartridge or other singe serve beverage device. The difficult to disperse portion tends to clump or agglomerate and not wet out easily. These difficult to disperse portions exhibit further deleterious dispersion effects when they are finely ground. For example, materials that are difficult to disperse include solids that are not readily soluble in water or other fluids and do not melt when introduced into a heated fluid. Examples of one of the co-milled ingredient includes, but are not limited to, non fat dry milk powder (NFDM), whole milk powder (WMP), proteins, dairy proteins, coffee powders, roast and ground coffee, cocoa powder, cream powder, fibers, and mixtures thereof. The difficult to disperse or dissolve portions of these materials may include non-fat dairy solids, proteins, non-soluble coffee solids, non-soluble cocoa solids, and mixtures thereof.

The dispersion or dissolving facilitator components, on the other hand, is or are a component of the blend that is effective to aids in enhancing the dispensability, dissolution, and/or dissolving of the difficult to disperse or dissolve portions of the powder when the powder is prepared by co-milling as described herein. Dispersion facilitators may include materials and solids that are water soluble, hydrophilic, or even hydrophobic materials that are effective, when added to a fluid or a heated fluid (such as fat containing materials that melt and flow when heated above a melting temperature or hydrophilic materials that aid in attracting water to the difficult to disperse portions) to improve dispersiblity or dissolving. Examples of suitable dispersion facilitator components include, among others, sugars, salts, fibers, lipids, dairy fats, oils, coffee oils, and other fats.

In one approach, hot water solubility (in cup dispersion) benefits are achieved when using fat containing materials as the dispersion facilitator if they are co-milled or co-ground with other ingredients, including difficult to disperse ingredients, in a milling process to a particle size of about 150 microns or less (in some cases about 100 microns or less) if the resultant powder contains between about 0.5 and about 40 percent dry weight lipid materials (in some cases between about 2 and about 30 percent dry weight lipids). This dispersion benefit is generally not achieved if the individual components of the powder are ground separately and then combined post grinding. In another approach, the powdered compositions herein may be suitable for use in cartridges, pods, sachets, or other containers configured for use in single-serve, on-demand beverage machines.

By one approach, the fat source or fat component in the powders may include any edible natural or synthetic lipophilic substance, including solid fat, liquid oil, fat substitute, or emulsifier, obtained or derived from any suitable plant, animal, or other source, including for example dairy fat as a component of a fat containing cream powder or milk powder. It may be present in pure form, or as a dispersion of emulsified or encapsulated liquid droplets, solid particles, or mixtures thereof, such as commonly occurs in spray-dried milk, creamer, and shortening powders. Preferably the fat source comprises triglycerides, diglycerides, monoglycerides, fatty acids, phospholipids, or mixtures thereof, obtained or derived from plant or animal sources including, but not limited to, fruits, vegetables, legumes, seeds, nuts, grains, and milks.

In another example, hot water solubility benefits are achieved for powders when they are formed using sugar or sugar containing materials as the facilitator either alone or in combination with fats when they are co-milled or co-ground with other difficult to disperse ingredients. As with fat containing ingredients, the dispersion benefits are generally not realized if the individual components of the powder are ground separately and then combined post grinding. By one example, the sugar or sugar containing material may includes any edible natural or synthetic soluble sugar substance, including, for example, granulated cane sugar and the like.

According to one aspect, the powders herein are formed from two or more ingredients that are selected and co-milled together to form a powder having a desired composition. At least one of the ingredients in the powder during co-milling is or contains a difficult to disperse portion and at least one of the ingredients in the powder during co-milling is or contains a dispersion facilitator. In other words, at least one ingredient in the powder is a material that when co-milled with one or more additional components, forms a resulting powder that possesses dispersion benefits. In one approach, the dispersion facilitator is a fat or lipid containing material. In this regard, the resulting powder composition may include between about 0.5 to about 40% dairy fat. In another example, the resulting powder composition may include between about 2% to about 30% dry weight lipid material. In some cases, the resulting powder composition may include between about 2% to about 20% dry weight lipid material. In another approach, the dispersion facilitator is a sugar or sugar containing component. In this manner, the resulting powder composition may include between about 2 to about 80% dry weight sugar or sugar containing material.

Without being limited by theory, it is believed that the inclusion of certain materials ("dispersion facilitators")

within the powder during co-milling of two or more ingredients, which is formed by co-milling the ingredients wherein at least one of the ingredients is or contains one or more dispersion faciliators at predetermined levels, becomes intimately associated with particles of other components of the powders and/or coat the resulting particles of the powder with to provide a coating, covering, and/or barrier to reduce the tendency of the particles from sticking together and agglomerating into a clump upon being combined with a fluid.

It has been surprisingly and unexpectedly found that co-milling native powders together, where one or more of the powders includes a dispersion facilitating component, for example a fat or sugar containing component, provides resulting powders that rapidly and thoroughly dissolve and disperse throughout the fluid and effectively form food and beverage products therefrom. In one approach, sugar and fat containing components are used as dispersion facilitators for co-milling with other ingredients to form powdered compositions that achieve dispersion benefits when forming beverages. In many cases, these powdered compositions achieve dramatically better dispersions (and/or dissolve) than either powders formed by separately jet-milling the same components and combining them or powders formed by simply combining the native components. More particularly, it is believed that when these powder are placed into a heated fluid medium (such as hot water at a water temperature above the melting point of the fat), the dispersion facilitators act as a barriers, coatings, or dustings on the particles (or the difficult to disperse portions thereof) to hinder and/or prevent the particles of hard to disperse components in the powder from sticking to each other due to electrostatic effects and surface tensions.

While not wishing to be limited by theory, when the dispersion facilitator component includes fat or a fat containing component, it is believed that the co-milling results in the hydrophobic fat particles forming a coating and/or becomes intimately associated with at least outer surface portions of the hard to disperse particles or portions thereof forming a barrier, coating, or dusting between the hard to disperse particles. When this co-milled powder is then placed in a heated fluid medium (above the melting point of the fat), the fat layer melts to provide a layer of lubrication so that the particles are able to disperse and/or dissolve substantially evenly and quickly into the solution. To this end, according to one approach the powder is formed from at least two ingredients, wherein at least one ingredient includes fat above a predetermined level, by co-milling the at least two ingredients together.

On the other hand, when the dispersion facilitator includes a sugar or a sugar containing component, it is believed (and not wishing to be limited by theory) that the sugar becomes intimately associated with at least outer surfaces of the particles or portions of harder to disperse components to similarly form a barrier, coating, or dusting between the harder to disperse particles. The sugar tends to be a hydrophilic particle that attracts water and may form pathways to pull water into contact to allow for more easily wetting of the hard to dissolve or disperse components. In this manner, when the powder is mixed with a fluid, the sugar particle barriers restrict strong electrostatic forces and surface tensions from forming between the hard to disperse particles and generally space them away from each other to form pathways for water to enter between the hard to disperse particles and wet them so that they quickly disperse throughout the fluid.

By one approach and not to be limited by theory, it is believed that the difficult to disperse or dissolve components tend to have surface characteristics, such as increased surface tensions and/or electrostatic effects that result in attraction between the difficult to dissolve or disperse portions. The dispersion or dissolving facilitator is effective to and may aids in modifying this outer surface tension or electrostatic effect (over un-milled samples or non-co-milled samples) to allow for the powders to more easily wet out, hydrate, and dissolve and/or disperse in fluids such as heated water.

Additional ingredients may be added to form the powder after the co-milling. If more than two ingredients are combined to form the powder, preferably any additional ingredients are combined with the ingredients prior to co-milling and the ingredients are co-milled to form the powder. More preferably all the ingredients are combined prior to co-milling the ingredients and all of the ingredients are co-milled together to form the powder. In this manner, it has been discovered that co-milling more of the ingredients together enhances the dispersibility of the final powder in a fluid medium versus co-milling some of the ingredients and subsequently combining additional ingredients at a later stage.

According to another aspect, the resulting co-milled powder has a dry Helos particle size distribution D90 of less than or equal to 100 microns. In some cases, the powder has a particle size distribution D90 of between about 10 microns and about 80 microns. In yet other cases, the powder has a particle size distribution D90 of between about 10 microns to about 50 microns. It is believed that various combinations of the particle size distribution, the fat levels, and/or the co-milling of ingredients at the same time is effective to provide enhanced dispersion of the particles into a solution.

According to yet another approach, a powder prepared in the preceeding manner is included in a single serve beverage pod or cartridge that is used with a beverage preparation machine for forming at least a portion of a beverage. The single serve beverage pod or cartridge includes a holding space that is sized to contain the co-milled powdered composition. For example, the holding space may include a rigid housing of a rigid and/or flexible pod or disc or the interior space of a flexible pod or sachet.

In one example, the pod or cartridge may include a Tassimo T-disc for use in a Tassimo Brewpot as generally described in U.S. Pat. No. 7,640,843 issued Jan. 5, 2010, which is here is hereby expressly incorporated herein by reference in its entirety as if the entire contents thereof were included herein. In another example, the pod or cartridge may include a porous pod or sachet formed of flexible porous material, much like a coffee filter that has one or more panels forming an enclosure defining a holding space.

According to this approach, the single serve beverage disc, pod, or cartridge includes at least one inlet and at least one outlet formable in or defined in the pod or cartridge. The inlet is provided for receiving water or other fluid injected into the holding space from a beverage preparation machine. The outlet is provided for dispensing at least a portion of a final beverage from the pod or cartridge into a container or cup for consumption by a consumer. The at least one inlet and/or at least one outlet may include openings that are preformed in the pod or cartridge, such as an aperture in a wall or panel of the pod or cartridge or the tiny pores of a porous panel, such as a filter panel that forms a pod. The inlet and/or outlet may also include openings that are not currently present in the cartridge or pod but are formable in the therein by, for example, piercing or puncturing a portion of the pod or cartridge or removing a portion of the pod or cartridge to form an opening therein.

The pod or cartridge may contain different amounts of the co-milled powdered composition within the holding space depending on the pod structure, the powder composition and desired beverage or beverage portion characteristics, the amount of desired beverage or beverage portion formable from the pod or cartridge and the structure of the pod or cartridge and beverage forming machine with which the pod or cartridge is intended to be used. In one example, the pod or cartridge may include about 6 to 20 grams of the co-milled powdered composition.

Similar to the co-milled powdered compositions described previously, the co-milled powdered compositions according to this approach include at least one powdered ingredient having a difficult to disperse portion and at least one dispersion facilitator component that are co-milled together to a d90 particle size of about 2 to about 150 microns. The co-milled powdered composition may include from about 2 to about 90 percent of one or more of the dispersion facilitator components. Single serve beverage pods or cartridge as described herein, containing these co-milled powdered composition achieve beneficial extraction and dispersion benefits when the cartridge or pod is used with a beverage preparation machine for forming a beverage or a portion of a beverage. Pods or cartridges including powders as described herein exhibit superior extraction and dispersion properties from the holding space as compared to pods or cartridges that include powders with similar compositions, but that were formed by simply mixing the constituent native ingredients together or by separately jet-milling the native ingredients and mixing them together to form the powders. The beneficial extraction and dispersion properties have been shown by measuring the amount of solids remaining in the pod or disc after running the disc through the beverage preparation machine and observing the particle distribution in the final beverage or beverage portion that is dispensed into a cup or container.

Further, the powders and compositions described herein provide enhanced dispersion and extraction properties even where the co-milled powdered composition is substantially free of and free of starches, flow aids, and emulsifiers that are typically used to increase the dispersability and flowability of powders for mixing with fluids. For example, the co-milled powdered compositions described herein may be substantially free from starches, flow aids, and emulsifiers selected from the group including cellulose, corn starch, lecithin, modified starches, and mixtures thereof. In one example, the beverage or portion of a beverage that is dispensed from the cartridge or pod has less than about 05% of each of the starches, flow aids, emulsifiers, and mixtures thereof (in other approaches, less than about 0.1%, in other approaches, less than about 0.05%, and in other approaches, none).

In another example, the single serve beverage pod or cartridge includes a co-milled powdered composition that effects an extraction of at least about 30 percent of solids from the holding space when the fluid is injected into the holding space and dispensed therefrom. In another example, the co-milled powdered composition effects an extraction of at least about 50 percent of solids from the holding space when the fluid is injected into the holding space and dispensed therefrom. In yet another example, the co-milled powdered composition effects an extraction of at least about 50 percent of solids from the holding space when the fluid is injected into the holding space and dispensed therefrom.

In one approach, beverages formed from the methods described above or from a single serve beverage pod or cartridge described above may include specific amounts of co-milled powdered composition per gram of a fluid in which the co-milled powdered composition is dispersed. In one example, the amount of co-milled powdered composition per gram of fluid ranges from about 0.05 grams of powdered composition per gram of water to about 0.5 grams of powdered composition per gram of water, and in another example from about 0.05 grams of powdered composition per gram of water to about 0.2 grams of powdered composition per gram of water. In another example, the beverages formed from the methods described above or from a single serve beverage pod or cartridge described may be effective to provide at least about 2 to about 16% solids dissolved in about 80 to about 90 grams of fluid in less than about 60 seconds without the need for substantial stirring or shaking of the fluid.

In yet another approach, a powdered beverage product is provided for mixing with a fluid to form at least a portion of a beverage. The packaged powdered beverage product includes a package that defines a compartment. A powdered composition is included in the compartment and includes a co-milled powdered composition with at least one powdered ingredient having a difficult to disperse portion thereof and about 2 to about 90 percent of one or more dispersion facilitator components. The facilitator components are co-milled together with hard to disperse components to a d90 particle size of about 2 to about 150 microns. And are effective to produce the at least a portion of a beverage with about 2 to about 16 percent solids from the co-milled powdered composition dispersed therein.

According to one aspect, the packaged powdered beverage product may include a measured quantity of co-milled powdered composition that is provided for being mixed with a measured quantity of fluid to form a typically sized beverage. For example, the packaged powdered beverage powder may include a sufficient quantity of co-milled powdered composition to provide a beverage between about 0.1 to about 64 fluid oz. of the beverage or portion of a beverage. In another example the packaged powdered beverage powder may include a sufficient quantity of co-milled powdered composition to provide a beverage between about 1 to about 24 fluid oz. of the beverage or portion of a beverage. In one approach, the measured quantity of co-milled powdered composition may be between about 0.5 to about 20 grams.

According to another aspect, the packaged powdered beverage product may include instructions on the package for instructing consumers to mix the powder with fluid at a certain ratio. In one example, the packaged powdered beverage product may include a measuring device for providing a measured quantity of the co-milled powdered composition and combining the co-milled powdered composition with a measured quantity of fluid. The measured quantities may include approximate measurements. By one approach, the instructions and/or the measuring device may provide for mixing approximately 0.05 grams of co-milled powdered composition per gram of water to about 0.5 grams of powdered composition per gram of water in one example or 0.05 grams of co-milled powdered composition per gram of water to about 0.2 grams of powdered composition per gram of water in another example.

In yet another approach, a method of preparing a co-milled powdered composition capable of preparing at least a portion of a beverage is provided. The method according to this approach may include introducing at least one powdered ingredient having a difficult to disperse portion and about 2 to about 90 percent of one or more dispersion facilitator components to a milling apparatus. The method according to this approach includes co-milling, in a sustained operation and at the same time, the at least one powdered ingredient and the one or more dispersion facilitator components to form the co-milled powdered composition with a d90 particle size of about 2 to about 150 microns. The powdered compositioned formed by the method herein is effective to produce at least a portion of a beverage when the co-milled powdered composition is contacted with water. The resulting beverage or portion of beverage has about 2 to about 16 percent solids from the co-milled powdered composition dispersed therein.

The method according to this approach is capable of sustained and continuous operation due to the jet-milling equipment and parameters that are selected for co-milling the components of the powders together, along with the ingredients that are selected for co-milling To this end, a jet mill is selected that is capable of continuous and sustained operation without substantial fouling, plugging, and the like. For example, a Jet-O-Miser (Fluid Energy, Telford, Pa.) jet mill may be used with a compressed air supply pressure of about 80 to about 110 psig and, in some cases, about 100 psig. To remove moisture from the air, a desiccant system may also be utilized to lower the dew point to below about −40° C. (typically about −50° C. to about −60° C.). The powders may be processed at ambient conditions (around about 20 to about 25° C.). Lower temperatures may be selected for co-milling powders with higher fat content to reduce the amount of fouling of the equipment due to the increased levels of fat. Feed rates may be between about 40 and about 100 grams per minute using a vibratory or other feed system. Upon processing, the co-milled powders may be isolated from the environment to minimize any humidity concerns.

In one example, co-grinding of roast and ground coffee and soluble coffee leads to improved dispersibility. Co-ground roast coffee (fat content 12%) with soluble coffee in a ratio from about 15% roast coffee (85% soluble) (approximately 2% fat content) to 50% Roast coffee (50% soluble coffee) (approximately 6% fat content) may be suitable. These co-ground mixtures showed reduced clumping of the non soluble roast and ground material when made up with hot water versus roast and ground material ground to the same particle size on its own using a cryogenic grinding method. Make up was standardized by dry mixing the ground material with standard soluble coffee so that in all cases there was 15% roast and ground material in every cup.

In another example, co-grinding chocolate ingredients leads to improved dispersibility. Ingredients for co-ground chocolate powder may include cocoa bean (including fats), sugar and milk powder. When these are ground together in a Jet mill, in proportions so that cocoa solids represented about 6.7% total mix, fat content 6.7%, milk solids 16.5%, sugar 60%, the resultant powder material dispersed into hot water (5 g in 200 ml) within 30 seconds while the equivalent mix of solids, when individually ground to the same particle size, and then dry mixed, dispersed in 3 minutes or more in hot water.

In yet another example, milk powders when co-ground show improved dispersibility. As a comparison, cream powders (40% fat content) and non fat milk solids show poor dispersion in hot water when micro ground separately as they can faint clumps when added to hot water (ratio 5 to 10 g/200 ml water). On the other hand, when creamer with non fat dairy milk solids is co-milled to obtain fat ratios of about 8-16% fat content, the resulting co-ground material dispersed more rapidly than the same combinations of dry mix materials whether the dry mix materials are pre-ground or mixed as original powders. In these exemplary compositions, the co-milling can be performed in a jet mill or other suitable milling equipment.

It will be appreciated that such examples are not an exhaustive list of possible material combinations, and these dispersion benefits are expected to be seen when co-grinding materials together, where at least one or more of the materials otherwise shows poor dispersion characteristics, and has a resultant fat content of the ground material between 2 and 30%.

According to yet another aspect, a method for combining a powder as described previously into a fluid so that the powder disperses into the fluid includes the step of heating the fluid to a predetermined temperature. According to this step, the fluid may be heated to a temperature between about 40-100° C. Preferably, the fluid is heated to a temperature between about 60° C. and 100° C. More preferably, the fluid is heated to a temperature between about 75° C. and about 100° C. In one approach, the fluid is preferably water that is heated to the desired temperature.

In one approach, the method includes another step of combining predetermined amounts of the powder and fluid. According to this approach the relative amounts of powder and fluid are selected to facilitate substantial dispersion of the powder into the fluid, while providing a sufficient amount of powder in the fluid to provide desirable flavor and mouthfeel qualities to the consumer.

In this specification unless otherwise required by the context, the term "roasted coffee" means a coffee substance that has been produced by the roasting of green coffee beans. The substance may be in the form of a roasted coffee bean or in some other form produced by onward processing steps such as grinding, decaffeination, pressing, etc. Particular examples of roasted coffee include roasted coffee beans, roasted expeller cake, roasted and flaked coffee.

In this specification, unless otherwise required by the context, the term disperse means that particles are distributed throughout a fluid medium. The term dissolve means that certain particles actually become incorporated into the fluid to form a solution. A powder may disperse into a fluid medium without actually dissolving into the solution. In addition, certain constituent ingredients within a powder may dissolve into the solution, while other ingredients disperse into the fluid and are suspended therein.

In this specification, the term "Helos particle size distribution D90", means the 90th percentile figure by volume of the particle size distribution, as obtained from a Helos™ laser light diffraction particle size analyzer available from Sympatec, Clausthal-Zellerfeld, Germany. That is, the D90 is a value on the distribution such that 90% by volume of the particles have a characteristic size of this value or less. The figure may be obtained for a dry sample (referred to as "dry Helos") or for a wet sample (referred to as "wet Helos"), e.g., after mixing of the particles with water. Likewise for D50 where the value represents the 50th percentile figure of the particle size distribution.

Helos is a laser diffraction sensor system for which one evaluation method is applied over the whole measuring range from 0.1 µm to 8750 µm. This instrument is designed for particle size analysis of dry and wet samples, i.e., of powders, suspensions, emulsions or sprays.

The beverage is made up to 1.5% concentration (3 g solids in 200 ml water) using 100° C. water and dripped into cuvette (with magnetic stirrer coated with PTFE running at 1000 RPM) to aim for an optical concentration between 20 and 25%. When using ultrasound, an integrated sonication finger made from Titanium can be lowered manually into the cuvette.

There are three options to measure particle size on the Helos system:

| Method name | Measuring range | Application | Settings used for micro milled coffee |
|---|---|---|---|
| Dry PSD | 0.1-3500 μm (1.8-250 μm with R4) | Direct measurement for milled product | Lens: R4 Copt 1.5% ref, 20 s Dispersion 100% 4 mm 3 bar |
| Wet PSD | 0.1-3500 μm (0.5-175 μm with R3) | Allows dissolution of soluble coffee product and gives roasted ground particle size formed in cup by hand stirring | Lens: R3 Cuvette settings |
| Wet PSD with ultrasound | 0.1-3500 μm (0.5-175 μm with R3) | Allows dissolution of soluble coffee and break-up of roasted ground clumps giving better indication of individual particle size | Lens: R3 Cuvette settings Ultrasonication time 60 sec |

Dry Particle Size Distribution measured using HELOS/KF, R4 Lens, RODOS/M Dispersing System and VIBRI Feeder manufactured by Sympatec GmbH. Wet Particle Size Distribution is measured using HELOS/KF, R3 Lens, CUVETTE Dispersing System manufactured by Sympatec GmbH.

According to one aspect, a method of forming a powder with the characteristics described previously includes a step providing ingredients having a predetermined level of fat or lipids. The method additionally includes the step of co-milling the ingredients of the powder together. Importantly, according to this step, the ingredients are co-milled together rather than being milled separately and mixed by other means. Again, without being limited by theory, it is believed that co-milling the ingredients simultaneously cause a fat layer to form on the exterior surfaces of the particles due to the collisions of the particles in the milling machine providing moisture protection to improve the dispersion of the powder in a heated liquid. According to this step, preferably at least two of the ingredients are co-milled and more preferably all of the ingredients are co-milled.

In one approach milling process for comminuting the ingredient precursors generally includes the steps of:

a) introducing particles of at least a first ingredient precursor into a milling chamber;

b) introducing particles of second ingredient precursor into the milling chamber, wherein at least one of the first ingredient precursor and the second ingredient precursor includes a fat or lipid;

c) jetting a gas into the milling chamber to mobilize the particles of the first and second ingredient precursors;

d) thereby producing a milled and blended powder by comminuting the particles of the first ingredient precursor and second ingredient precursor by self-collision of the particles of the first ingredient precursor and second ingredient precursor and by collision of the particles of second ingredient precursor with the particles of the first ingredient precursor within the milling chamber.

Advantageously, comminuting the first and second ingredient precursors in this manner has been found to provide an excellent means for reducing the particle size of the ingredients without the deleterious effects previously encountered by, for example release of coffee oil or cocoa alcohol. Without wishing to be bound by theory, it is understood that the incorporation of the particles of the ingredients into the milling chamber results in the becoming coated with fat or lipids.

If preferred, the ingredients can be directed to impact additional surfaces, such as impact plates, of the milling chamber to provide additional comminution effects. However, the use of such impacts is not essential to the process.

The particles of the ingredient precursors may be mixed together before introduction into the milling chamber. For example, the ingredients may be batch mixed in the dry form and introduced into the milling chamber via a common hopper feed.

Alternatively the particles of the ingredient precursors may be introduced separately into the milling chamber. For example separate hoppers for each ingredient may be provided.

Another possibility is the use of a single feed line which may be used to jet one precursor into the milling chamber which acts to entrain the other precursor into the flow. In some cases, the physical components of the milling apparatus (chamber walls, feed lines, etc.) may not be cooled. However, it may be desirable to chill the jetting gas in order to help remove moisture during the milling process. The chilled gas will result in some cooling of the milling apparatus. However, this is significantly less than typically results during cryogenic cooling. The absence of active cooling (or the use of minimal cooling as described above) may reduces the complexity of the machinery required for the milling process, speeds up the process time and reduces the costs associated with the milling stage of the process.

In one example, the first ingredient includes a roasted coffee and the second ingredient includes a soluble coffee to form a milled and blended coffee product. The ground roast coffee has a fat content of about 12%. The soluable coffee has a fat content of about 6%. In this example, the milled and blended coffee product produced in step d) comprises 10 to 70% by dry weight roasted ground coffee and 30 to 90% by dry weight soluble coffee. More preferably the milled and blended coffee product produced in step d) comprises 15 to 50% by dry weight roasted ground coffee and 50 to 85% by dry weight soluble coffee. In one example the milled and blended coffee product produced in step d) comprises 50% by dry weight roasted ground coffee and 50% by dry weight soluble coffee.

Preferably in step d) of the above method, in this example, the comminution results in the co-milled and blended product having a dry Helos particle size distribution D90 of less than or equal to 40 microns. More preferably in step d) the comminution results in the milled and blended coffee product having a dry Helos particle size distribution D90 of less than or equal to 30 microns.

The particles of roasted coffee precursor may be whole roasted coffee beans or coarsely-ground roasted coffee beans. The process finds application with whole roasted coffee beans which provides a simplified process route. However, if desired, an initial coarse grind of the roasted coffee beans can be carried out before the roasted coffee is inserted into the milling chamber. Similarly, where other ingredients are used, the ingredients may be initially course ground prior to insertion into the milling chamber. For example, when a cocoa powder is being formed, an ingredient precursor may include whole cocoa beans, cocoa nibs, or pre ground cocoa beans or nibs.

In one example, particles of soluble coffee may be particles of spray-dried instant coffee, particles of freeze-dried instant coffee, or a mixture thereof.

There may be advantages in using a soluble coffee type that matches the type of end product that the milled and blended coffee product is to be utilized in. For example, where ultimately the milled and blended coffee product is to be incorporated in a freeze-dried coffee product then the soluble coffee product used as a comminuting agent in the milling chamber may be chosen also to be freeze-dried soluble coffee. However, the types of soluble coffee used in the process may be mixed and altered as desired.

Preferably the gas jetted into the milling chamber in step b) is nitrogen, air, or a mixture thereof.

The milling chamber may form part of a jet mill. Examples of such mills include fluid bed opposed jet mills, Jet-O-Mizer™ mills, vortex mill, spiral mills, etc.

The milled and blended powder may be used as a milled and blended food or beverage intermediate in for mixing with a fluid and other ingredients may also be added. Alternatively, the milled and blended powder may be used in the onward production of other food or beverage products. Further, the milled and blended powder may be packaged and sold as an end product in its own right.

In one aspect of the present disclosure, a co-milled and blended dry powder for dispersing into a fluid to form a food or beverage product or intermediate may be produced by comminuting two or more ingredient precursors, where at least one of the ingredient precursors includes an amount of fat or lipid, is prepared by co-milling the ingredient precursors at the same time or concurrently in a milling apparatus such as a jet mill or the like. A suitable jet mill is the Jet-O-Mizer™ mill available from Fluid Energy Processing and Equipment Company, Telford, Pa., USA. Another suitable mill is the Hosokawa Alpine Fluid Bed Opposed Jet Mill—AFG, available from Hosakawa Micron Ltd, Runcorn, Cheshire, United Kingdom. Other suitable milling apparatus include mills referred to as spiral mills and vortex mills. In general, the process is a dry milling process that generally avoids the use of liquids, sprays, melting, and the like.

By example and not limitation, a schematic illustration of the working principles of a jet mill is shown in FIG. 1. The mill 1 comprises a milling chamber 2 having a feed inlet 3, a series of gas inlets 4, a size classification wheel 8 and a product outlet 5.

The milling chamber 2 of FIG. 1 takes the form of a generally cylindrical body having the gas inlets 4 at a lower end and spaced around the periphery and the product outlet 5 located near an upper end.

The feed inlet 3 communicates with the milling chamber 2 to allow ingredient precursors, for example, whole or coarsely-ground roasted coffee beans and soluble coffee particles or cocoa nibs, to be fed into the milling chamber 2 tangentially at a location at or near the chamber periphery.

The size classification wheel 8 is located near the upper end of the milling chamber 2 and is adapted to received comminuted particles from the chamber 2 and pass those under a desired particle size to the product outlet 5.

The ingredient precursors are dry batch mixed at the required ratio and then deposited in a hopper which communicates with the feed inlet 3 as shown schematically in FIG. 1 by arrow A. A feed gas supply may be provided to entrain the precursors from the hopper and convey them to the chamber 2.

Compressed gas is supplied in use to the plurality of gas inlets 4. The gas inlets 4 are orientated at an angle to the radial direction of the chamber 2—preferably tangentially to the chamber 2—such that flow of gas through the gas inlets 4 sets up a swirling, spiralling gas flow within the chamber 2.

In use, to comminute the ingredient precursors, the precursors are fed into the chamber 2 and mobilized in the chamber 2 by the high speed flow of gas entering the chamber 2 through the gas inlets 4 (and also the feed gas (where used) entering with the precursors through the feed inlet 3).

Comminution occurs due to the high velocity collisions between the particles of the ingredient precursors resulting in pulverization of the ingredient precursors. As the particle size reduces the smaller particle sizes move up the chamber 2 into the size classification wheel 8. The size classification wheel 8 acts to classify the particles it receives and pass onward to the product outlet 5 those particles less than a desired particle size. The particles exit the mill as shown schematically in FIG. 1 by arrow B. The larger particles are retained in the chamber and are subject to further comminution. Thus, the jet mill also helps to classify the particle size output through the product outlet 5. Depending on the type of jet mill, the orientation and configuration of the milling chamber 2, gas inlets 4, and product outlet 5 can be altered.

The gas supplied to the gas inlets 4 and the feed gas for conveying the ingredient precursors into the chamber 2 may be air, but is preferably an inert gas, such as nitrogen. The feed gas may be dehumidified with a desiccant or a refrigerated dryer to help remove moisture.

The ingredient precursors may include a variety of different ingredients and may be coarsely ground using a conventional milling process to have a particle size of greater than 100 microns prior to milling.

In one approach, the powder may generally include types of powders that are typically combined with heated fluid to form food or beverage products or intermediates. By example only, the powders are suitable for combination with heated water or milk to form heated beverages such as dairy products, sauces, instant coffee, hot chocolate, teas, and the like. The powders may also include cocoa powders that are combined with heated fluid to form chocolate bars. By another example, the powders may include ingredients that are combined with heated fluids to create sauces, for example cheese sauce for Kraft® Macaroni and Cheese products sold by Kraft Foods, Inc. Other powders products may also be appropriate.

In the example of forming a coffee powder, the soluble coffee may be a spray-dried or freeze-dried instant coffee product. The particle size of the soluble coffee product before jet milling is typically between 100 and 350 microns for spray-dried soluble coffee and 0.1 to 3.5 mm for freeze-dried soluble coffee.

In some approaches, the mill 1 is not subjected to cryogenic cooling prior or during the milling process. Rather, the mill 1 is operated at substantially the ambient temperatures existing at the location where the mill 1 is situated. As noted above, the feed gas may be chilled which may result in a modicum of cooling of the apparatus components.

In other approaches, the ingredient precursors are not subjected to cryogenic cooling or any cryogenic pre-treatment prior to milling. For example, the temperature of a roasted coffee precursor when filled into the hopper 6 will be in the range 5 to 30° C. The roasted coffee precursor may be at the ambient room temperature of the milling apparatus.

In one example, the milled and blended coffee product obtained from product outlet 5 comprises 20 to 90% by dry weight soluble coffee and 10 to 80% by dry weight roasted ground coffee (in some cases, 30 to 90% soluble and 10 to 70%). Preferably the milled and blended coffee product comprises 50 to 85% by dry weight soluble coffee and 15 to 50% by dry weight roasted ground coffee. More preferably the milled and blended coffee product comprises 50% by dry weight soluble coffee and 50% by dry weight roasted ground coffee.

After milling, the milled and blended powder has a particle size distribution D90 of less than or equal to 100 microns. Preferably, the powder has a particle size distribution D90 of between about 10 and about 80 microns. More preferably, the powder has a particle size distribution D90 of between about 10 and about 50 microns. In one example, a milled and blended coffee product has a particle size distribution with a dry Helos particle size distribution D90 of less than or equal to 40 microns, more preferably less than or equal to 30 microns.

Advantages and embodiments of the products and methods described herein are further illustrated by the following Examples. However, the particular conditions, processing schemes, materials, and amounts thereof recited in these Examples, as well as other conditions and details, should not be construed to unduly limit this method. All percentages are by weight unless otherwise indicated.

EXAMPLES

Example 1

Figure 2:
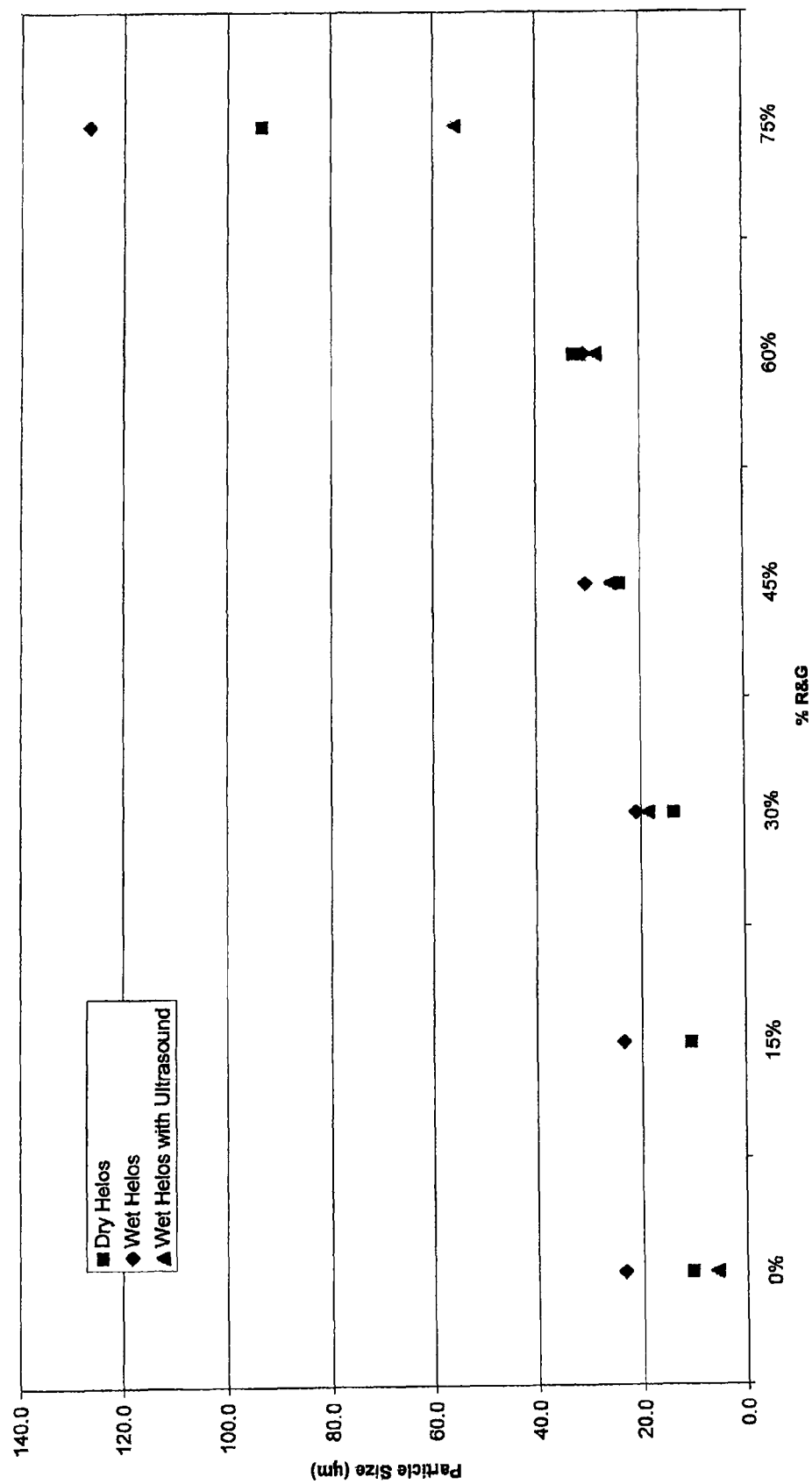
FIG. 2 is a graph of particle size in microns against Helos particle size distribution D90.
Figure 3:
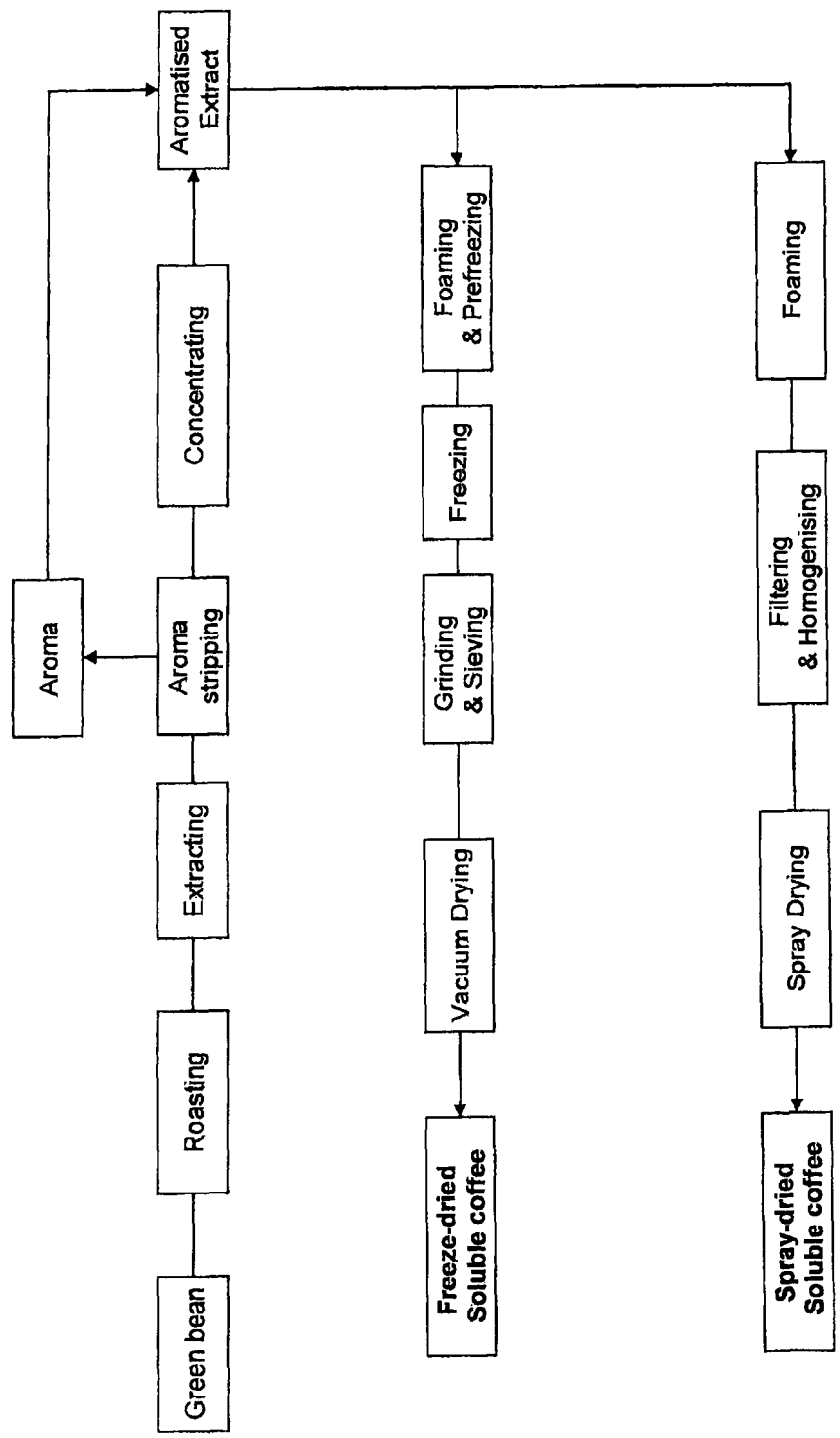
FIG. 3 is a flow diagram illustrating prior art processes for forming freeze-dried and spray-dried soluble coffee.

FIG. 2 shows results for the dry Helos particle size distribution D90 (and in addition wet Helos figures) for milled and blended coffee products produced according to the present disclosure as a function of the dry weight percentage of roasted ground coffee present. As can be seen, from 10 to 70% of roasted ground coffee the dry Helos particle size distribution D90 is less than or equal to 40 microns. Above 70% roasted ground coffee the dry Helos particle size distribution D90 increases deleteriously. At or below 50% roasted ground coffee a dry Helos particle size distribution D90 of 30 microns or less is achievable.

In a separate example, a blend of Brazilian and Columbian Arabica beans was roasted and pre-ground to a D50 of 500 microns. The resulting roasted coffee precursor was dry batch mixed with Arabica spray-dried coffee at a ratio of 50% roasted coffee precursor to 50% spray-dried coffee precursor. The resultant blend was then milled in a Hosokawa Alpine Fluid Bed Opposed Jet Mill—AFG at a variety of feed rates and classifiers speeds. The following results were obtained:

| Feed Rate (kg/hour) | Classifier Speed (RPM) | Run time (mins.) | Dry Helos D50 | Dry Helos D90 |
|---|---|---|---|---|
| 120 | 2350 | 30 | 10.5 | 27.5 |
| 50 | 2000 | 38 | 11.4 | 28.7 |
| 50 | 2000 | 60 | 11.0 | 27.2 |

Advantageously, as can be seen for each example a dry Helos particle size distribution D90 of less than 30 microns was obtainable at a range of feed rates and classifier speeds.

After the powder has been formed by co-milling the ingredient precursors, the powder may be subject to additional processing or the further addition of ingredients.

The novel process for forming a powder will now be shown by example for forming an instant coffee product. The remainder of the procedure depends on whether the soluble product is to be spray-dried or freeze-dried. For spray-dried soluble coffee the remaining process steps include foaming, filtering and homogenizing and spray drying to produce the spray-dried product. For freeze-dried soluble coffee the remaining process steps include foaming and pre-freezing, freezing, grinding & sieving and vacuum drying.

According to the present disclosure these known processes are adapted by the incorporation of a milled and blended coffee intermediate containing a percentage of roasted ground coffee. In each of the processes described below, the milled and blended coffee intermediate itself may contain 10 to 70% by dry weight roasted ground coffee and 30 to 90% by dry weight soluble coffee. Preferably, the milled and blended coffee intermediate contains 15 to 50% by dry weight roasted ground coffee and 50 to 85% by dry weight soluble coffee. In one example the milled and blended coffee intermediate comprises 50% by dry weight soluble coffee and 50% by dry weight roasted ground coffee.

The soluble coffee component of the milled and blended coffee intermediate in any of the processes below may be derived from spray-dried instant coffee, freeze-dried instant coffee, or a mixture thereof.

The milled and blended coffee intermediate preferably has a dry Helos particle size distribution D90 of less than or equal to 40 microns, more preferably less than or equal to 30 microns.

In each of the processes described below the end coffee product may comprise 5 to 30% by dry weight roasted ground coffee and 70 to 95% by dry weight equivalent of soluble coffee. (For example, a soluble coffee end product containing 15% by dry weight roasted ground coffee and 85% by dry weight equivalent soluble coffee can be obtained by mixing the liquid coffee concentrate with a dry milled and blended coffee intermediate having 50% by dry weight roasted ground coffee and 50% by dry weight soluble coffee in a ratio of 70:30 coffee concentrate intermediate to milled and blended coffee intermediate.

In a preferred option, the milled and blended coffee intermediate is produced using the novel process of the present disclosure described above with reference to FIG. 1. However, milled and blended coffee intermediates having the requisite percentages of roasted ground coffee and soluble coffee may be used, even where produced by alternative means.

Figure 4A:
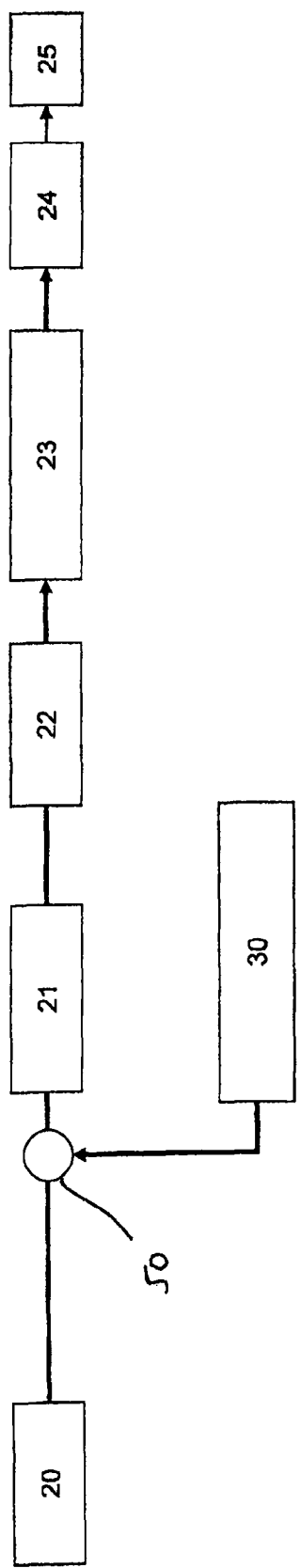
FIG. 4a is a flow diagram illustrating a process for forming a freeze-dried soluble coffee product according to the present disclosure.

FIG. 4a shows a first freeze-dried process for forming a freeze-dried soluble coffee product 25. A coffee concentrate intermediate 20 (aromatised or non-aromatised) is mixed with a milled and blended coffee intermediate 30 using a high shear mixer 50 prior to the foaming and pre-freezing step 21. Suitable mixers include high shear batch mixers and high shear in-line mixers available from Silverson Machines Ltd, Chesham, United Kingdom. The mixture is then foamed and pre-frozen at step 21 and then fed to a belt freezer 22 for a further freezing step. The frozen intermediate is then ground and sieved at step 23 to produce a particle size range of 0.3 to 3.5 mm, preferably 0.3 to 2.5 mm, more preferably 0.3 to 1.5 mm. The intermediate is then vacuum dried at step 24 to produce the freeze-dried soluble coffee product 25. The product may then be packed in a known manner.

Figure 4B:
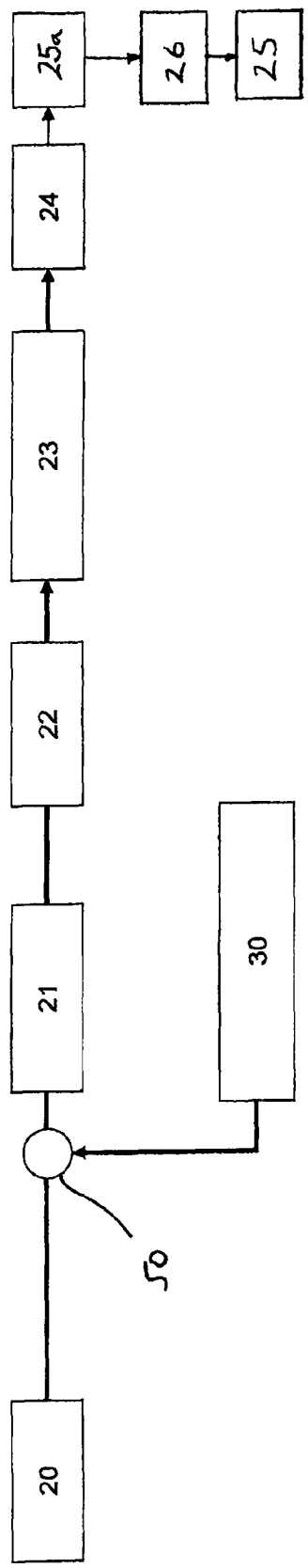

A modification to the process of FIG. 4a is shown in FIG. 4b. The process is as described above with reference to FIG. 4a up to step 22. At step 23, however, the frozen intermediate is ground and sieved to produce a larger particle size range of 1.0 to 3.5 mm. The intermediate is then vacuum dried at step 24 to produce an intermediate freeze-dried soluble coffee product 25a. At step 26 the intermediate freeze-dried soluble coffee product 25a is subject to a secondary grinding to reduce the particle size range to 0.3 to 1.5 mm to produce the freeze-dried soluble coffee product 25. The product may then be packed in a known manner.

Figure 5A:
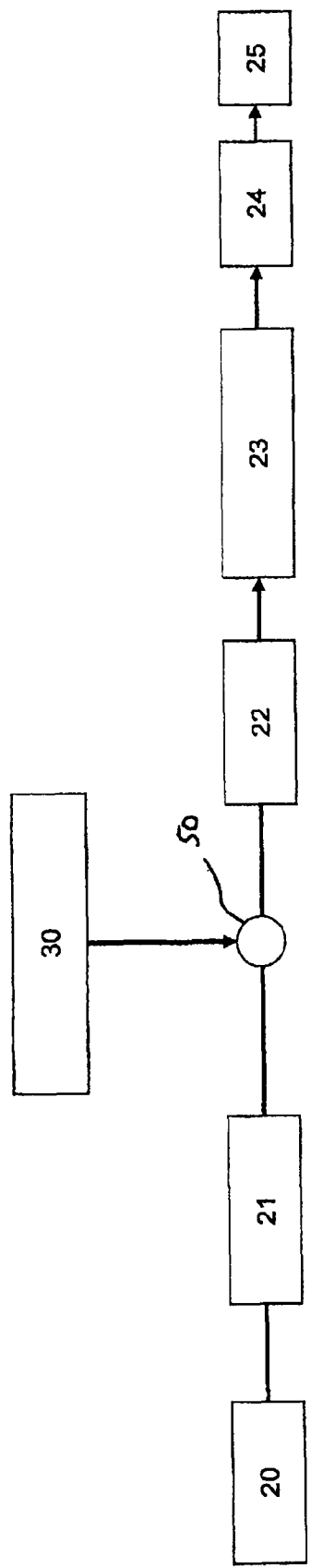
FIG. 5a is a flow diagram illustrating another process for forming a freeze-dried soluble coffee product according to the present disclosure.

FIG. 5a shows a second freeze-dried process for forming a freeze-dried soluble coffee product 25. The process is the same as the first process described above with reference to FIG. 4a with the exception that the milled and blended coffee product 30 is incorporated after the foaming and pre-freezing step 21. Again, a high shear mixer 50 of the type described above may be used and in other respects the process is the same as the first process.

Figure 5B:
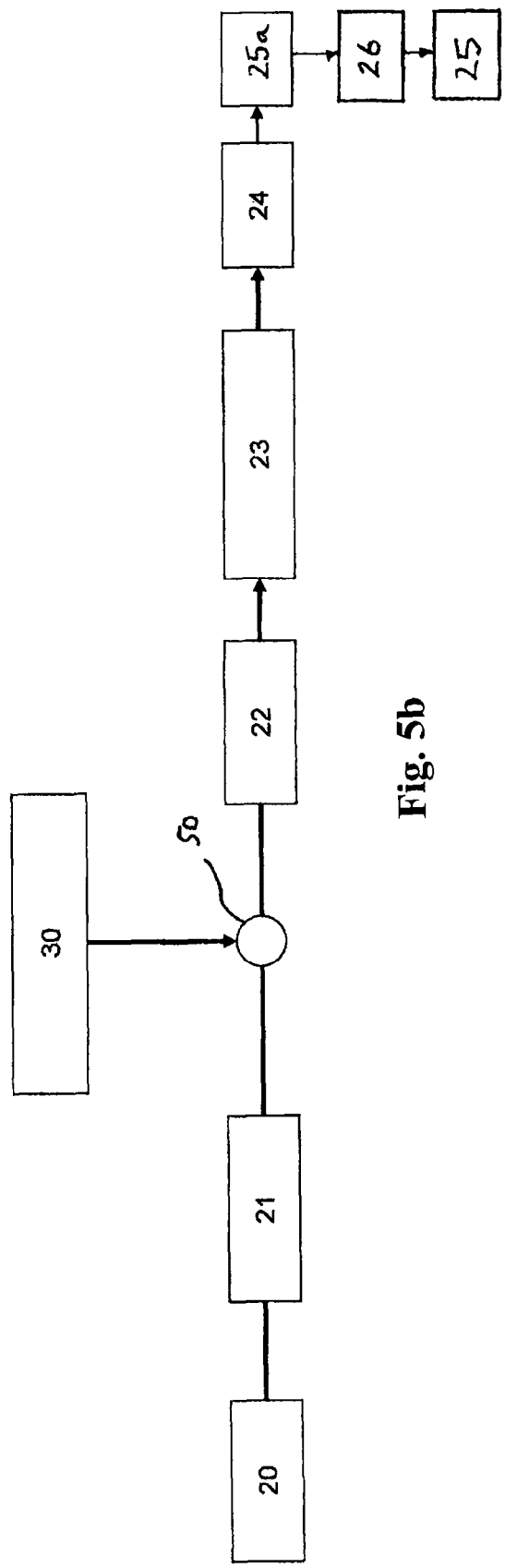

A modification to the process of FIG. 5a is shown in FIG. 5b. The process is as described above with reference to FIG. 5a up to step 22. At step 23, however, the frozen intermediate is ground and sieved to produce a larger particle size range of 1.0 to 3.5 mm. The intermediate is then vacuum dried at step 24 to produce an intermediate freeze-dried soluble coffee product 25a. At step 26 the intermediate freeze-dried soluble coffee product 25a is subject to a secondary grinding to reduce the particle size range to 0.3 to 1.5 mm to produce the freeze-dried soluble coffee product 25. The product may then be packed in a known manner.

An advantage of the modified processes of FIGS. 4b and 5b is that the particle size during vacuum drying is larger than in the processes of FIGS. 4a and 5a which has been found to lead to less product losses during drying. It has been found that with the processes of FIGS. 4a and 5a potential product losses occur when vacuum drying very small particle sizes due to the particles being carried off along with the evaporating water content of the intermediate.

A further advantage of the processes of the present disclosure is that it has been found that they allow a higher concentration of soluble solids to be incorporated in the product prior to freeze drying. In known freeze drying processes it is typical for the amount of soluble solids to be contained in the product prior to be a maximum of approximately 45-50%. This is due to the limited solubility of the coffee solids in water. The present applicant has found that the processes of FIGS. 4a, 4b, 5a and 5b allows soluble solids levels of up to 58% to be achieved while still permitting the steps of foaming, pre-freezing and freezing to be carried out. This results in more efficient energy use and higher levels of product throughput. While not wishing to be bound by theory it is believed that incorporation of the milled and blended coffee intermediate 30 results in higher levels of solubility of the coffee solids.

Figure 6:
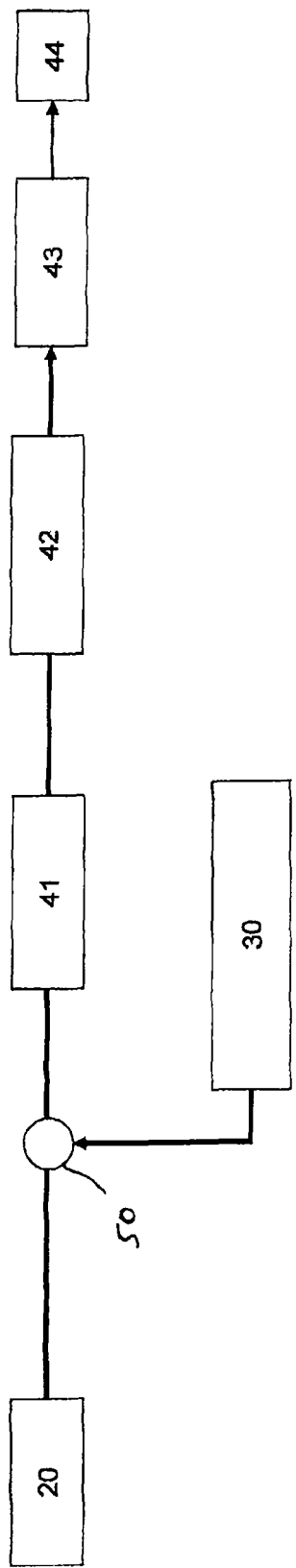
FIG. 6 is a flow diagram illustrating a process for forming a spray-dried soluble coffee product according to the present disclosure.

FIG. 6 shows a first spray-dried process for forming a spray-dried soluble coffee product 44. A coffee concentrate intermediate 20 (aromatised or non-aromatised) is mixed with a milled and blended coffee intermediate 30 using a high shear mixer 50 prior to the foaming step 41. A high shear mixer 50 of the type described above may be used. The mixture is then foamed at step 41 and then filtered and optionally homogenised at step 42. The intermediate is then spray dried at step 43 to produce the spray-dried soluble coffee product 44. The product may then be packed in a known manner.

Figure 7:
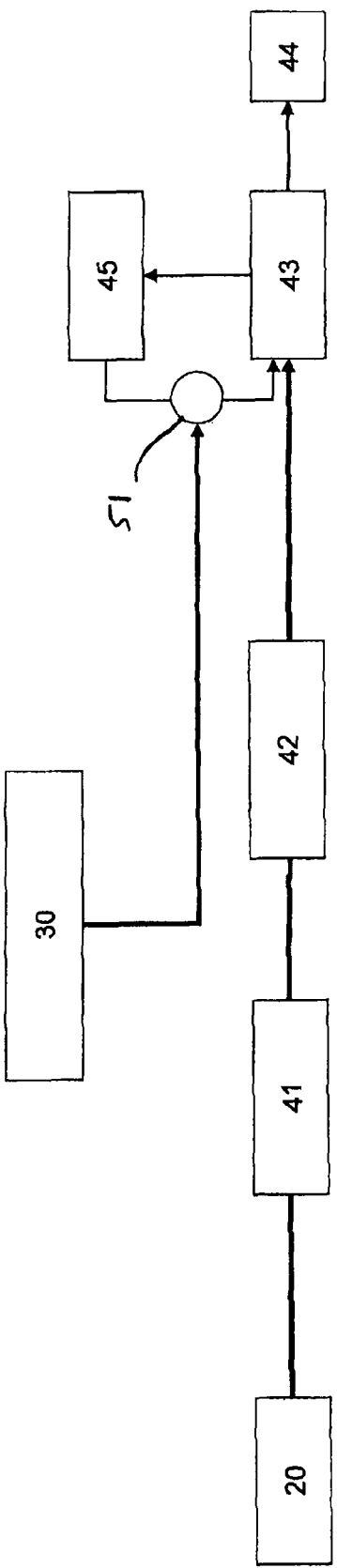
FIG. 7 is a flow diagram illustrating another process for forming a spray-dried soluble coffee product according to the present disclosure.
Figure 8:
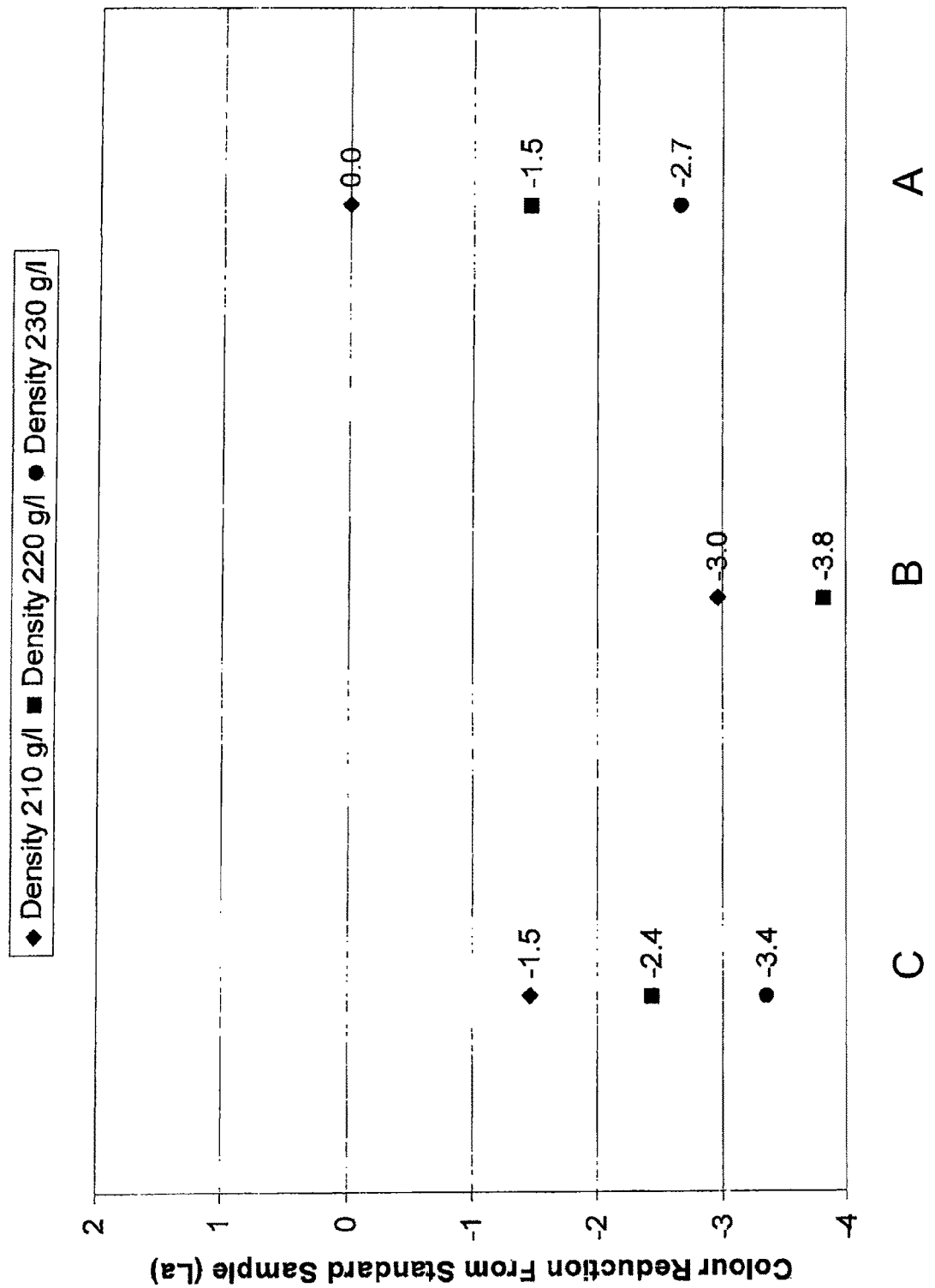
FIG. 8 is a graph of colour reduction in La units for various freeze-dried soluble coffee products.

FIG. 7 shows a second spray-dried process for forming a spray-dried soluble coffee product 44. The process is the same as the first spray-dried process described above with the exception that the milled and blended coffee product 30 is incorporated into a dry mix. In particular, the spray-drying apparatus (as known in the art) comprises a fines collector for recycling coffee powder fines. At step 51, the milled and blended coffee intermediate 30 is fed into the recycling line from the fines collector and is therefore incorporated into the product during the spray-drying stage.

It has been found that the milled and blended coffee intermediate formed by jet milling has very good dispersion characteristics in liquids (such as hot water or concentrated liquid coffee extract).

Example 4

Various samples were made to compare co-milling to individual grinding of powder components.

Sample 1: 100% Arabica beans roasted, then cryogenically ground using prior art techniques. 15% by dry weight of the resultant ground material was then dry mixed by hand with 85% of Arabica-based dried soluble coffee—end composition 15% by dry weight roasted ground coffee, 85% by dry weight equivalent soluble coffee.

Sample 2: 15% Arabica beans roasted, then jet milled with 85% Arabica-based, dried soluble coffee—end composition 15% by dry weight roasted ground coffee, 85% by dry weight equivalent soluble coffee.

Sample 3: 30% Arabica beans roasted, then jet milled with 70% Arabica-based, dried soluble coffee to form blended intermediate, 50% by dry weight of blended intermediate dry mixed by hand with 50% by dry weight of Arabica-based dried soluble coffee—end composition 15% by dry weight roasted ground coffee, 85% by dry weight equivalent soluble coffee.

Sample 4: 50% Arabica beans roasted, then jet milled with 50% Arabica-based, dried soluble coffee to form blended intermediate. 30% by dry weight of blended intermediate dry mixed by hand with 70% by dry weight of Arabica-based dried soluble coffee—end composition 15% by dry weight roasted ground coffee, 85% by dry weight equivalent soluble coffee.

Beverages were then prepared from the samples and dry and wet Helos (with and without ultrasound) particle size distributions were measured, with the following results:

| Sample | Dry Helos D90 μm | Wet Helos—Stirred D90 μm | Wet Helos— Ultrasound D90 μm |
|---|---|---|---|
| 1 | 27.2 | 69.4 | 22.1 |
| 2 | 10.5 | 28.5 | 17.8 |
| 3 | 17.4 | 35.6 | 23.1 |
| 4 | 27.2 | 60.7 | 29.8 |

Wet Helos of the stirred sample represents the particle size when first made up and is higher where there is poor dispersion of the finely ground roasted coffee particles in water, thereby forming "clumps" of material. That clumps are formed can be determined by comparing to the Wet Helos with ultrasound measurement. The ultrasound acts to break up the clumps (if present).

As can be seen from the results, the comparative Sample 1 formed with cryogenically-ground roasted coffee has poor dispersion characteristics and significant clumping—verified by the large difference between the wet Helos figures with and without ultrasound—even though the product has the same total roasted ground coffee content as Samples 2 to 4. By comparison Samples 2 and 3 of the present disclosure have much better dispersion where the milled and blended coffee intermediate has 15 or 30% by dry weight roasted ground coffee. Sample 4 with 50% by dry weight roasted ground coffee shows some improvement over the prior art composition but less than Samples 2 and 3.

Example 5

Two samples of a chocolate intermediate were prepared where dry materials of a chocolate recipe were co-milled in a GVTC jet-mill to form a powder. In Sample 1, the fat in the recipe came from the cocoa nibs. In Sample 2, the cocoa nibs were excluded to determine whether fat coming from other materials, e.g., cocoa powder and cream powder could produce similar dispersion results. The composition of the samples was as follows:

| Type | Ingredients | Sample 1 (%) | Sample 2 (%) | Fat (%) | Cocoa-Solids (%) | Milk Solids (%) |
|---|---|---|---|---|---|---|
| Sugars | Sugar | 59.60 | 59.61 | | | |
| Cocoa | Cocoa Nibs | 13.42 | | | | |
| | Cocoa Powder | | 7.46 | 0.74 | 6.71 | |
| Dairy | Whole Milk Powder | | | | | |
| | Sweet Whey Powder | 10.53 | 10.52 | | | |
| | Skimmed Milk Powder | 16.45 | 7.50 | | | 7.50 |
| | Cream Powder | | 14.91 | 5.96 | | 8.95 |
| | Total Dry (%) | 100.00 | 100.00 | | | |

10 g of each powder sample were placed into sample cups. Beakers were filled with 200 mL of water and the water was heated to 170° F. The powder was dumped into the hot water and the powder was observed until it was completely dispersed in the waters. The following results were obtained.

| Samples | % fat | g/200 mL water | Dissolution Time 1 (min) | Dissolution Time 2 (min) | Average |
|---|---|---|---|---|---|
| Sample 1 | 6.71 | 5 | 0:23 | 0:26 | 0:245 |
| Sample 2 | 6.71 | 5 | 3:07 | 3:00 | 3:04 |

The data illustrates that Sample 1, using fat from the cocoa nibs exhibited superior dispersion qualifies when added to the heated water versus Sample 2, which utilized fat from cream powder and cocoa powder.

Example 6

Ten samples including different combinations and levels of cream powder, nonfat dry milk ("NFDM"), and sugar were co-milled using a GVTC Jet-Mill using 105 psi grinding air and a 35 psi nozzle pressure at approximately 68° F. The samples were Milled to a D90. The compositions of the samples were as follows.

| Samples | Cream Powder (%) | LH NFDM (%) | Sugar (%) | Jet-Mill | % fat |
|---|---|---|---|---|---|
| 1 | 0 | 100 | 0 | y | 0 |
| 2 | 5 | 95 | 0 | y | 2 |
| 2 | 10 | 90 | 0 | y | 4 |
| 3 | 20 | 80 | 0 | y | 8 |
| 4 | 30 | 70 | 0 | y | 12 |
| 5 | 40 | 60 | 0 | y | 16 |
| 6 | 40 | 60 | 0 | NO | 16 |
| 7 | 40 | 30 | 30 | y | 16 |
| 8 | 40 | 30 | 30 | NO | 16 |
| 9 | 100 | 0 | 0 | NO | 40 |
| 10—Blend* | 20 | 80 | 0 | y/y | 8 |
| 11—(repeat 10) | 20 | 80 | 0 | y | 8 |

*blend included 20 g of 40/60 milled cream powder and NFDM and 20 g of 100% NFDM, Jet-milled Measured amounts of each sample were next placed into weigh cups and covered. 200 mL of water at about 170 F was poured into a 300 mL beaker. The contents of each cup were sprinkled into the water in the beakers and a timer was started. The powder was observed and the following results were obtained.

If the powder did not disperse into the solution on its own after two minutes passed, the solution was stirred and observed to determine if the powder would disperse. The table is designated ('n/a') for these trials. If the solution partially hydrated, the time was recorded when the powder stopped dispersing into the solution and stirred. The solution was observed to determine whether any additional powder dispersed into the solution.

| Samples | g/200 mL water | Time 1 (min) | Time 2 (min) | Average | Comments |
|---|---|---|---|---|---|
| 1 | 5 | n/a | | | clumps, lot on surface |
| 2 | 5 | n/a | n/a | | after 1:15, still a lot on surface, 2:00 stir allowed it to go into solution |
| 2 | 5 | n/a | n/a | | after 1:15, mostly dissolved, some still on surface, 2:00 stir goes into solution |
| 3 | 5 | 2:00—Stir | 1:14—Stir | | Most dissolves, begin stirring once particles on surface cease going into solution |
| 4 | 5 | :27 | :52 | :39.5 | powder sinks and goes into solution |
| 5 | 5 | :13 | :15 | :14 | goes into solution very quickly, easy dissolves |
| 6 | 5 | :30 | :18 | :24 | Some fish eyes and clumps but goes into solution; powder addition makes a big difference on clump formation |

-continued

| Samples | g/200 mL water | Time 1 (min) | Time 2 (min) | Average | Comments |
|---|---|---|---|---|---|
| 7 | T1 = 5, T2 = 10 | :13 | :17 | :15 | Increased amount added because both went in so quickly, noticed a difference when a larger amount was present |
| 8 | T1 = 5, T2 = 10 | :14 | :33 | :23.5 | Unmilled still looks a little grainy when I pour out the cup (un-stirred) |
| 9 | 5 | 3:00—stir | | | clump on top, hardly any dissolved; even after stirring clump was hard to hydrate |
| 10—Blend* | 5 | n/a—2:15 | n/a—3:00 | | after T1, some dissolved into solution, stirred; T2—lot left on top of water, stir |
| 11—(repeat 10) | 5 | 1:17—stir | 1:37—stir | | almost all dissolved on surface, then stir |

The results show that Samples 5 and 7, which each included 40% cream powder, and were jet milled, exhibited superior dispersion qualities. The replacement of sugar for a portion of the NFDM in Sample 7 did not affect the dispersion qualifies. Comparing the results of Samples 5 and 7 to Samples 6 and 8, demonstrates that co-milling the fat containing cream powder with the other ingredients provides enhances dispersion qualities over simply combining the ingredients by other means, as in Samples 6 and 8. This example also demonstrates that increasing the amount of fat by increasing the level of cream powder enhances the dispersion up to a threshold, as shown by Sample 9, which contained 100% cream powder and would not disperse in the water.

Example 7

Sample powders were formed by co-milling NFDM and sugar in a GVTC Jet-Mill using 105 psi grinding air and 35 psi nozzle pressure at a temperature of about 68° F. About 5 g of the sample powders were measured into weigh cups and covered. About 200 mL of water was heated to about 170° F. and poured into a 300 mL beaker. The powder was sprinkled into the beaker on top of the water and a timer was started. The powder was observed for dispersion into the water. If the powder partially hydrated, the time was recorded that the powder stopped dispersing into the solution, and the solution was stirred to determine whether more powder would disperse into the solution. The following table provides the compositions of the samples and the results of the test.

| Samples | Sugar (%) | LH NFDM (%) | g/200 mL water | Time (min) | Comments |
|---|---|---|---|---|---|
| 1 | 10 | 90 | 5 | 3:03—stir | Stopped dissolving after 3:03, large clumps on surface |
| 2 | 25 | 75 | 5 | 3:18 | All into solution, no stirring required |
| 3 | 50 | 50 | 5 | 3:53 | All into solution, no stirring required |

From the sample in Example 6, when compared with the results of Example 7, illustrates that including certain amounts of fat during the co-milling improves the dispersion qualities of the final powder. NFDM does not go into hot water on its own, but co-milling NFDM with sugar helps. However, it is still not as good as the NDFM co-milled with cream powder (a fat source). A comparative blend of about 40/60 cream/sugar goes into solution on its own after about 14 seconds, which is much faster than the about 50% sugar version. Example 7 includes only sugar and NFDM and for each sample, at least three minutes passed prior to the powder becoming dispersed in the fluid.

Example 8

Sample powders were formed using different combinations of non-fat dry milk (NFDM), cream (40% fat, spray dried), and sugar. In a comparative process, the ingredients were not milled or ground and simply mixed together in their original or native form at different percentages (samples identified as "not milled"). In a second comparative process, the ingredients were individually and separately jet-milled and then mixed together (samples identified as "blended"). In an inventive process, the ingredients were co-milled together at the same time in a jet mill (samples identified as "co-milled"). The blended and co-milled samples were milled at the same conditions to generally achieve the same d90 particle size distributions.

For milling, a Jet-O-Miser (Fluid Energy, Telford, Pa.) was used with a compressed air supply pressure of about 100 psig. To remove any moisture from the air, a desiccant system was also utilized to lower the dew point to below about −40° C. (typically −50° C. to −60° C.). The powders were processed at ambient conditions (around 20 to 23° C.) for these runs. Feed rates were typically about 80 grams per minute using a vibratory feed system. Upon processing, the milled powders were stored in plastic bags to minimize any humidity concerns.

All samples were freshly processed and packaged into standard Tassimo T-Discs and sealed with foil lids. For each variable, four pods were prepared to accommodate sample variability during processing. Pods were hand loaded with about 9 grams of powder, sealed, then individually weighed to ensure pod-to-pod variability was accounted for.

Each sample was brewed using a Tassimo brewer with fresh water. The water temperature delivered was about 99° C. Water delivered to the Disc averaged about 90 grams. Average water delivered to cup for all samples (based on measured weight in cup and subtracting dispersed solids from pod) was about 87 to about 88 grams confirming minimal liquid holdup in the Disc. For each sample, the sample cup was tared on a balance, the sample was then "brewed", and then the weight of extracted liquid (water+powder solids dispersed from pod) was recorded. The sample Disc then had its foil lid cut open and folded back, and the Discs were placed into a 60° C. oven (with exhaust air) overnight to ensure the remaining Disc solids were dry. Final weights for each Disc were measured and the dispersed solids were calculated.

The d90 particle sizes for the different compositions were about the same for both the co-milled and blended compositions. For example, one sample that included 80% NFDM, 20% dehydrated cream (40% fat), 0% Sugar had the following d90 particle sizes: Unmilled=156 micron; Co-Milled=21 micron; and Blended=16 micron. Another sample that included 80% NFDM, 10% dehydrated cream (40% fat), 10% Sugar had the following d90 particle sizes: Unruffled=162 micron; Co-Milled=22 micron; and Blended=16 micron. Another sample that included 40% NFDM, 40% dehydrated cream (40% fat), 20% Sugar had the following d90 particle sizes: Unruffled=356 micron; Co-Milled=108 micron; and Blended=121 micron.

The amount of extracted powder from the Tassimo pods for each of the four trials that were performed for every powder combination and each of the three processes (not milled, co-milled, and blended) were averaged. The average amount of extracted powder for each powder formulation was then plotted on a graph with the Y-axis indicating the percentage of the initial amount of powder that was extracted from the pod during brewing (identified as % dispersed from pod) and the X-axis indicating the total amount of fat (FIGS. 9A-9H) or sugar (FIGS. 10A-C) in the powder formulation tested.

FIGS. 9A-9H illustrate powder formulations that contained non-fat dry milk, optional sugar, and amounts of cream to give different total fat contents between 0 and 36%. For each graph, the powders were formed with increasing amounts of sugar (0, 10, or 20%) while the fat level was held constant. The remaining weight percentage of each of the powders was comprised of NFDM. As mentioned four Discs were formed from each sample and the amount of extracted powder for each of the four trials was averaged and plotted on the Y-axis. The graphs illustrate the amount of powder dispersed from the Discs for each of the three methods of forming the powders (i.e., not milled, co-milled, and blended) and compares the amount of powder extracted out of the pod for each of these powder processing methods. Thus, the graphs illustrate the effect of increasing the sugar content (i.e., X-axis) of each of the powders where the fat content is held constant on the amount of powder dispersed from the pods. The graphs also demonstrate that co-milled powders including fat and/or sugar provide dramatically increased dispersibility of the powder out of a Disc.

Figure 10A:
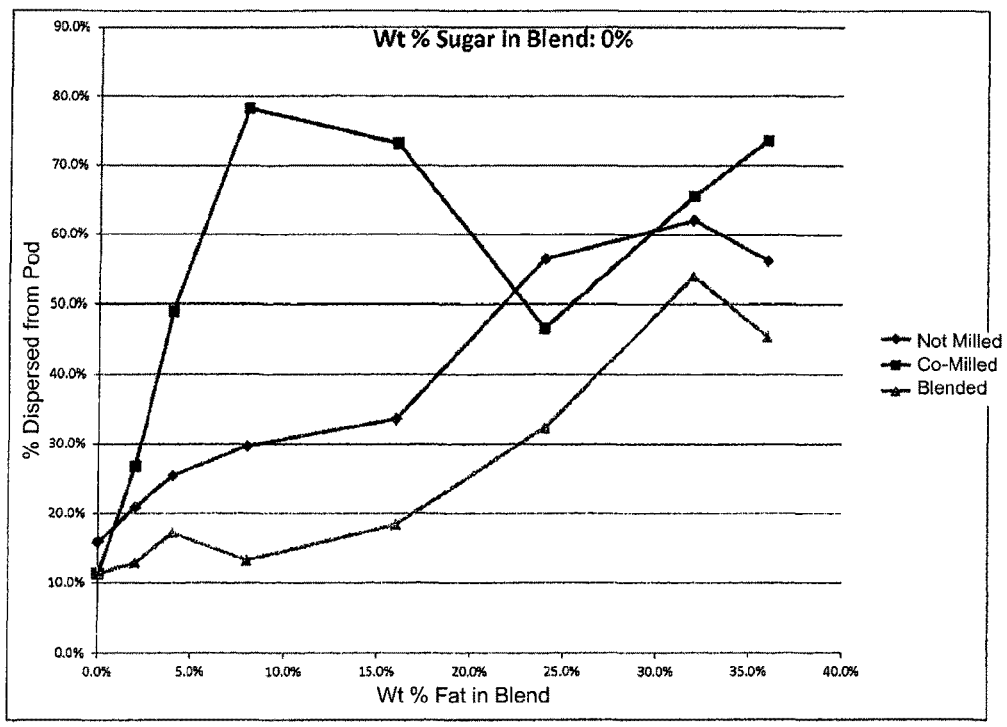
FIGS. 10A-C are graphs illustrating the amount of co-milled powdered composition that was extracted from Discs at constant sugar levels where the level of fat within the compositions is altered and showing the amounts of powdered compositions extracted for compositions that were co-milled, non-jet milled, and separately jet milled and combined.
Figure 10B:
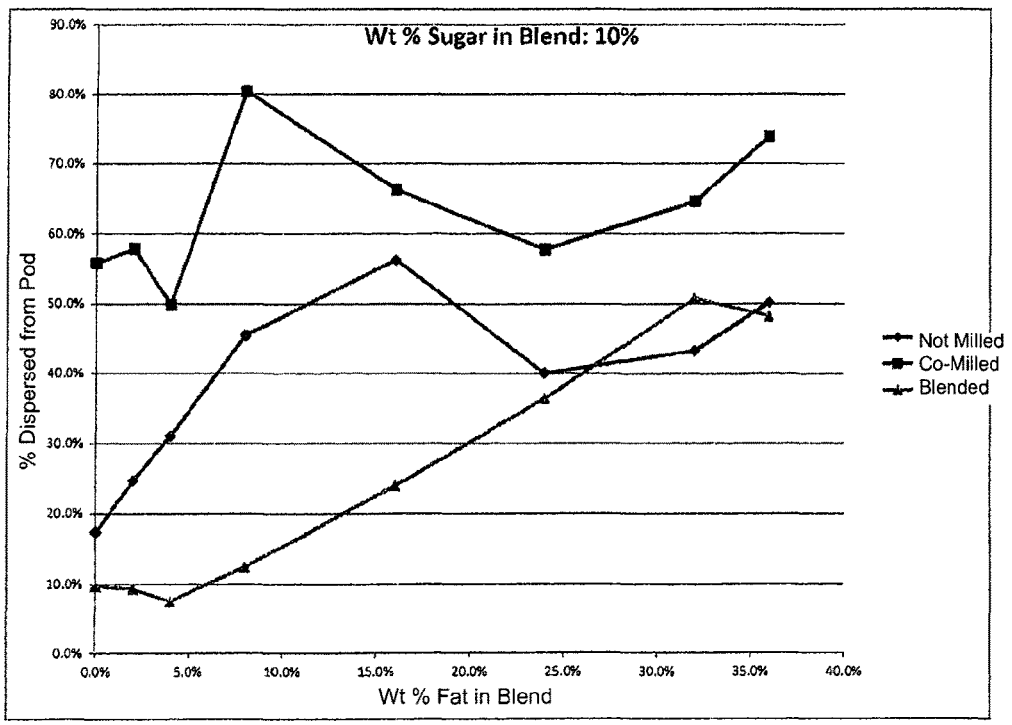
Figure 10C:
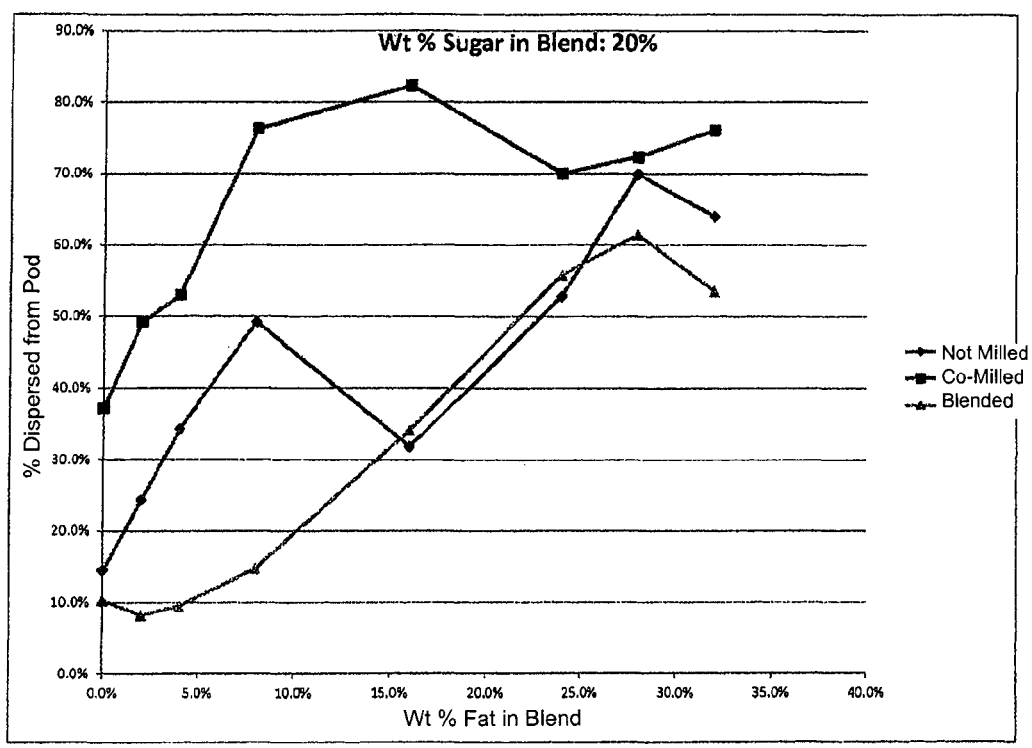

FIGS. 10A-C illustrate the results in a different format where each graph shows a formulation holding sugar constant with total weight percentage of fat increased. These figures illustrate the effect of increasing the fat content (X-axis) of each of the powders where the sugar content is held constant on the amount of powder dispersed from the pods. As with the previous graphs, this format also demonstrates the dramatic ability of co-milled powder to increase powder dispersibility.

Figure 9A:
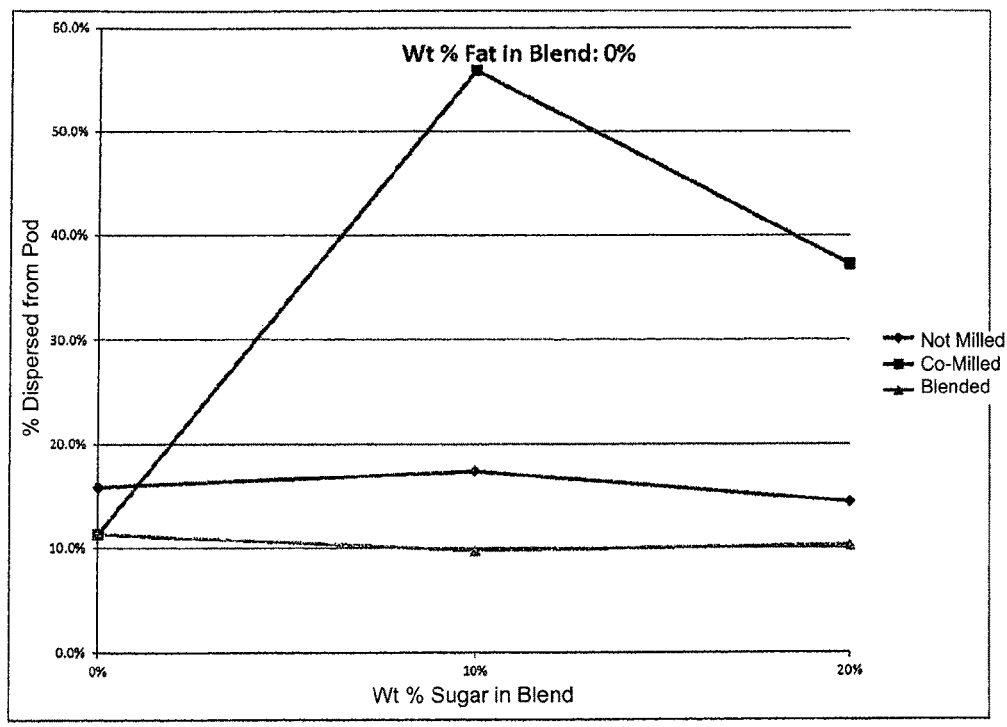
FIGS. 9A-9H are graphs illustrating the amount of co-milled powdered composition that was extracted from Discs at constant fat levels where the level of sugar within the compositions is altered and showing the amounts of powdered compositions that were co-milled, non-jet milled, and separately jet milled and combined.

More particularity and as shown in FIGS. 9A to 9H and FIGS. 10A to 10C, the separately jet-milled and blended samples (labeled as "blended") generally exhibit worse extraction and dispersion properties than the samples that were not even milled at all (that is, the ingredients were simply mixed together in their original or native forms (labeled as "not milled")). For example and as shown in FIG. 9A, the blended sample that had powder components individually milled demonstrated % dispersion performance worse than if those same ingredients were simply mixed without any blending. Neither provided acceptable dispersion.

On the other hand, the Figures also illustrate the surprising and unexpected result that co-milling provides to the powders. By co-milling the non-fat dry milk with sugar and/or fat enhances the powders' dispersion efficiency even when the powders are co-milled to substantially the same d90 particle size as the comparative blended samples. For example, in FIGS. 9A through 9H, the co-milled samples generally exhibited significantly higher extraction efficiency (i.e., higher % dispersed from Disc) than the comparative blended samples. For example, the co-milled samples provided at least about 30% and, in some cases, at least about 30 to about 85% higher Disc extraction efficiency as compared to the blended samples of generally the same particle size.

Figure 9B:
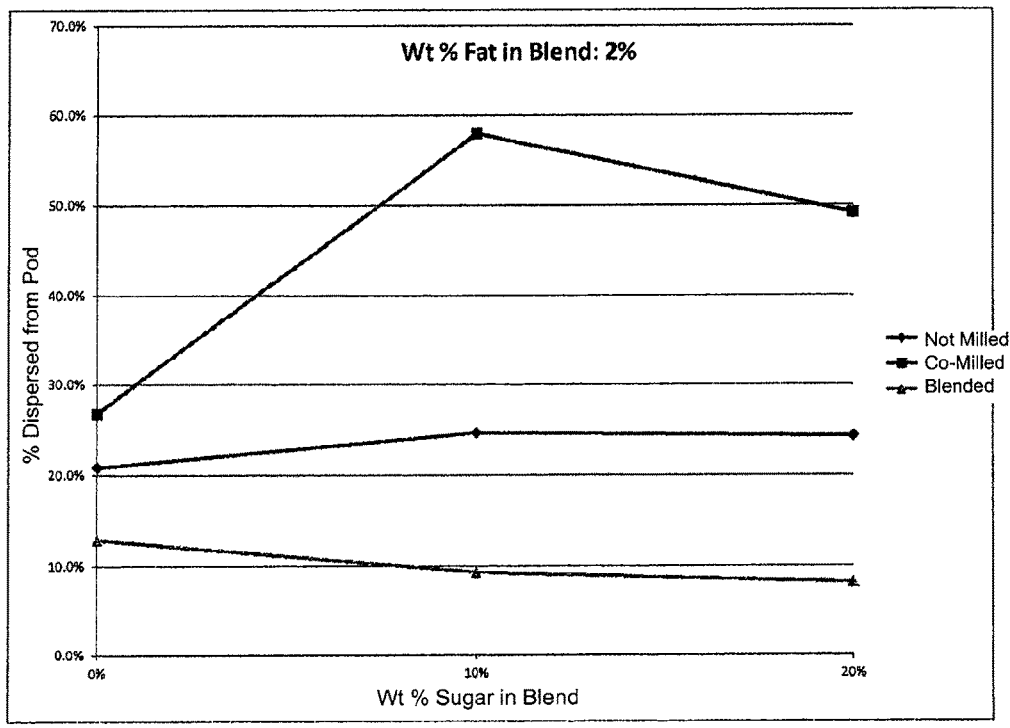
Figure 9C:
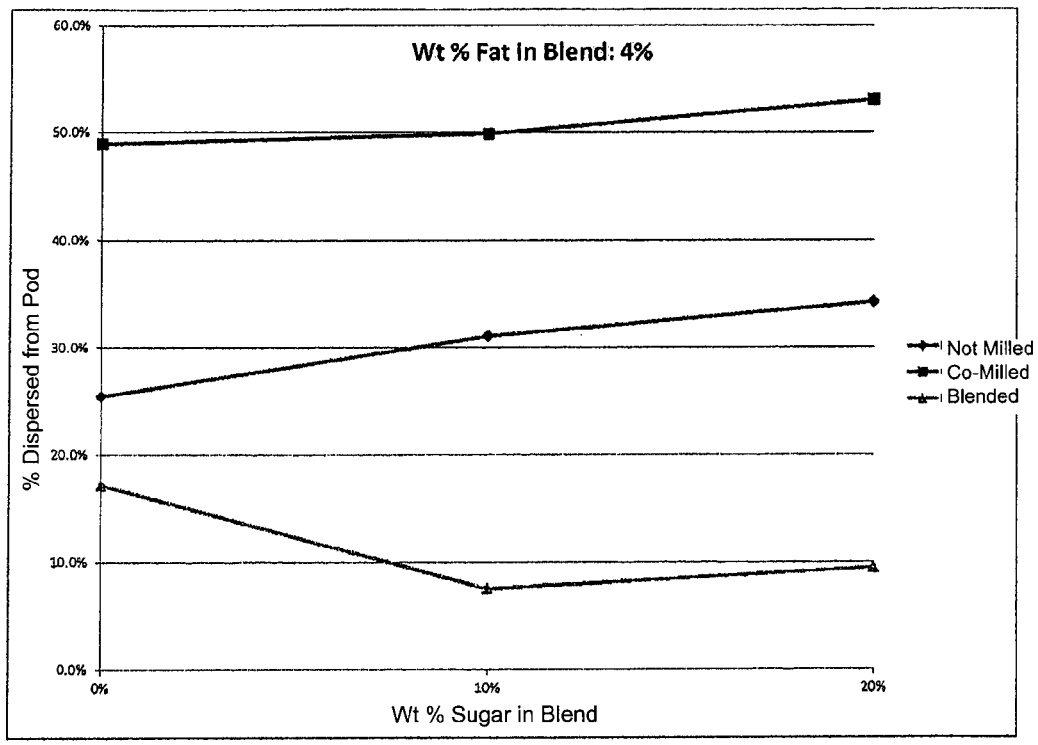
Figure 9D:
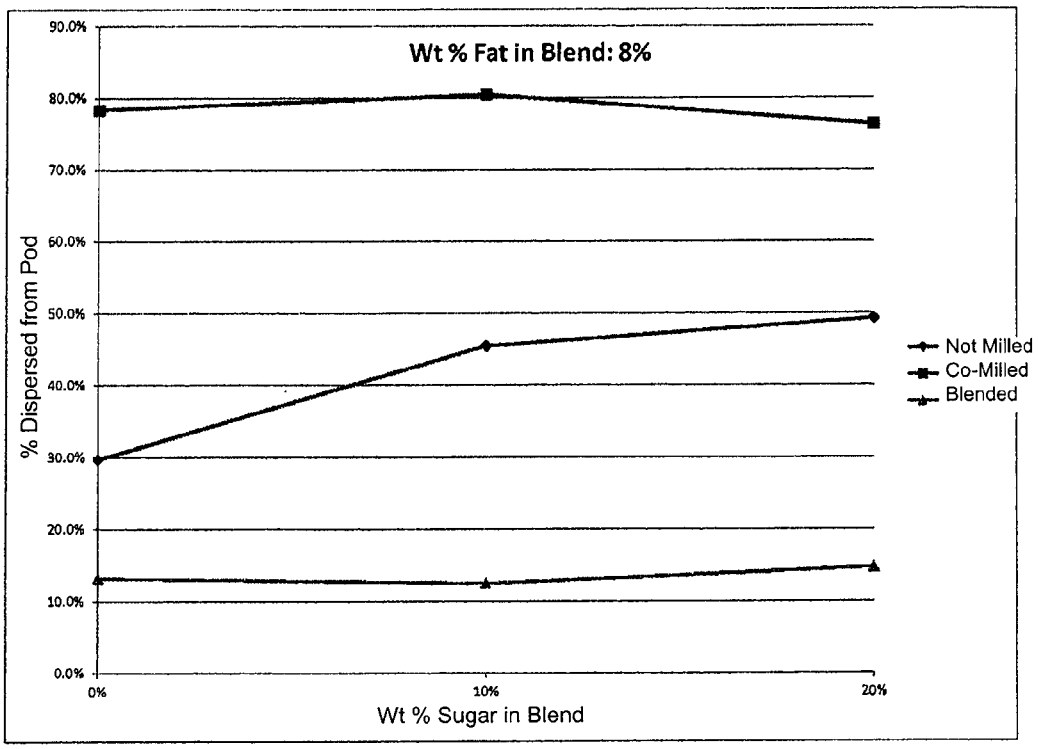
Figure 9E:
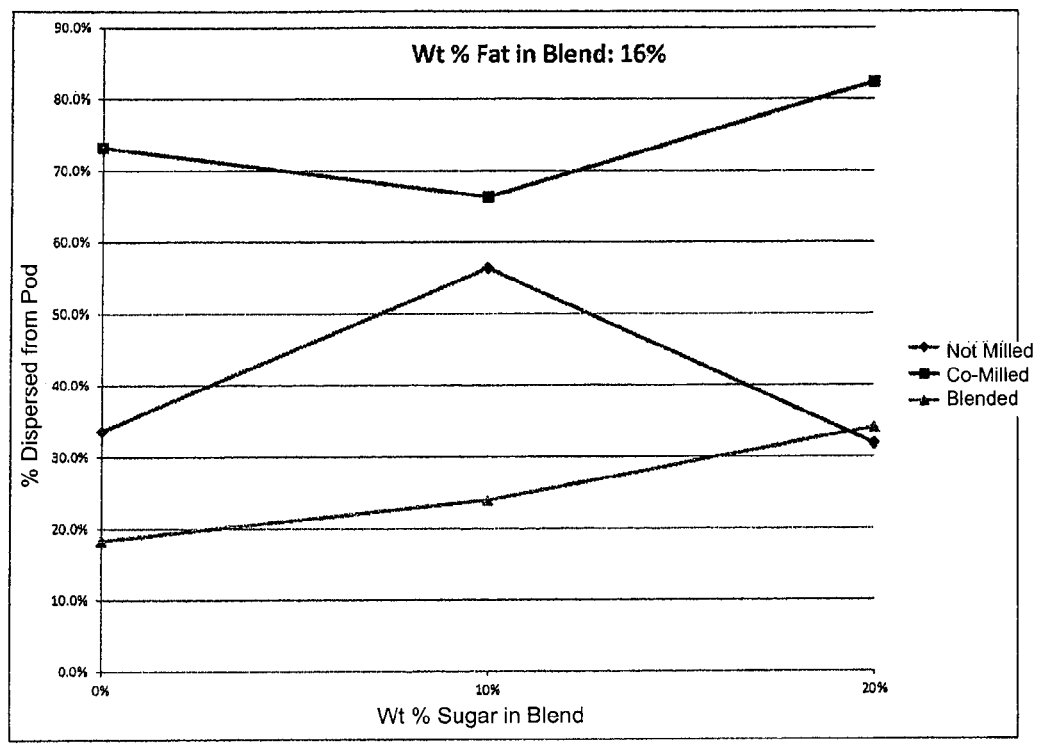
Figure 9F:
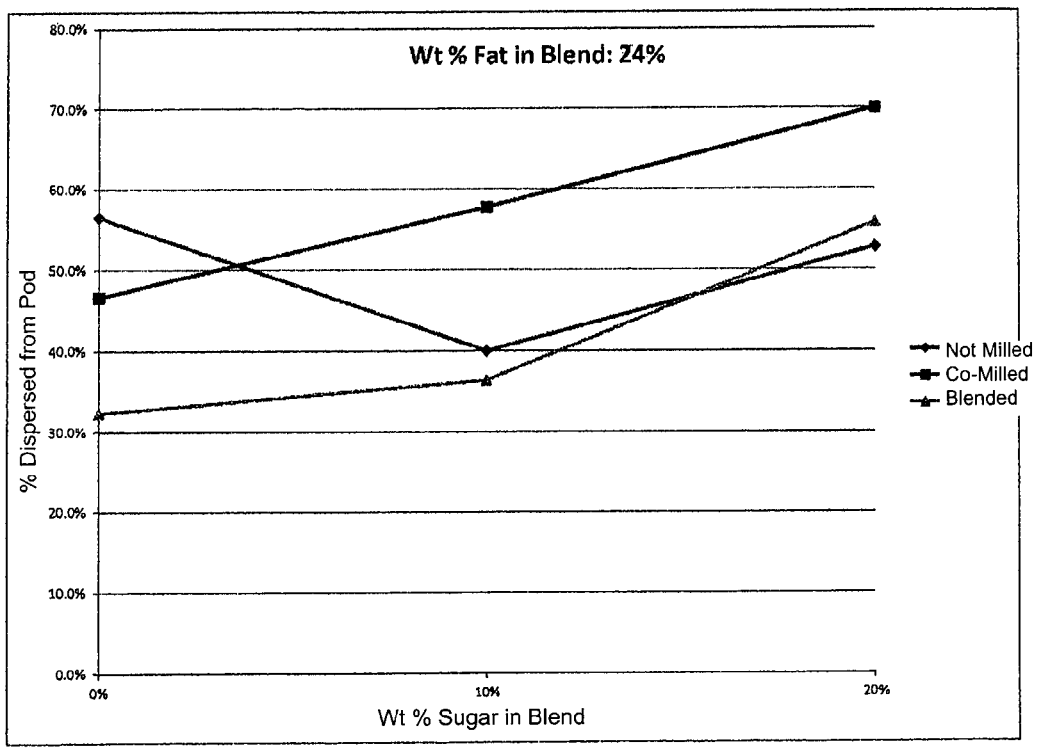
Figure 9G:
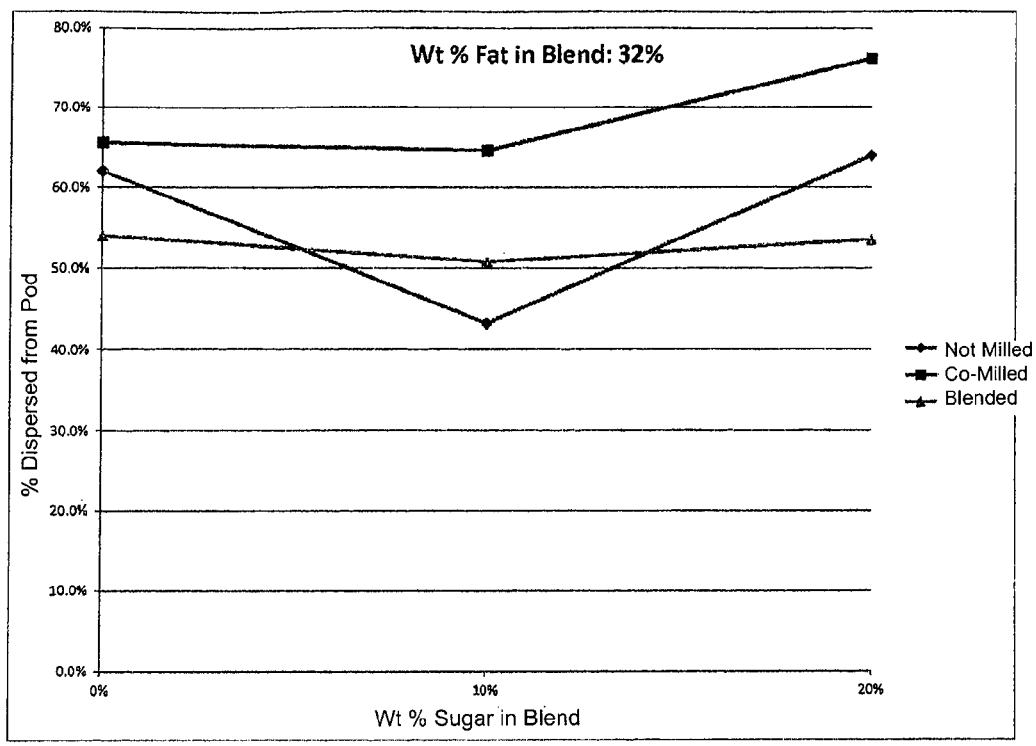
Figure 9H:
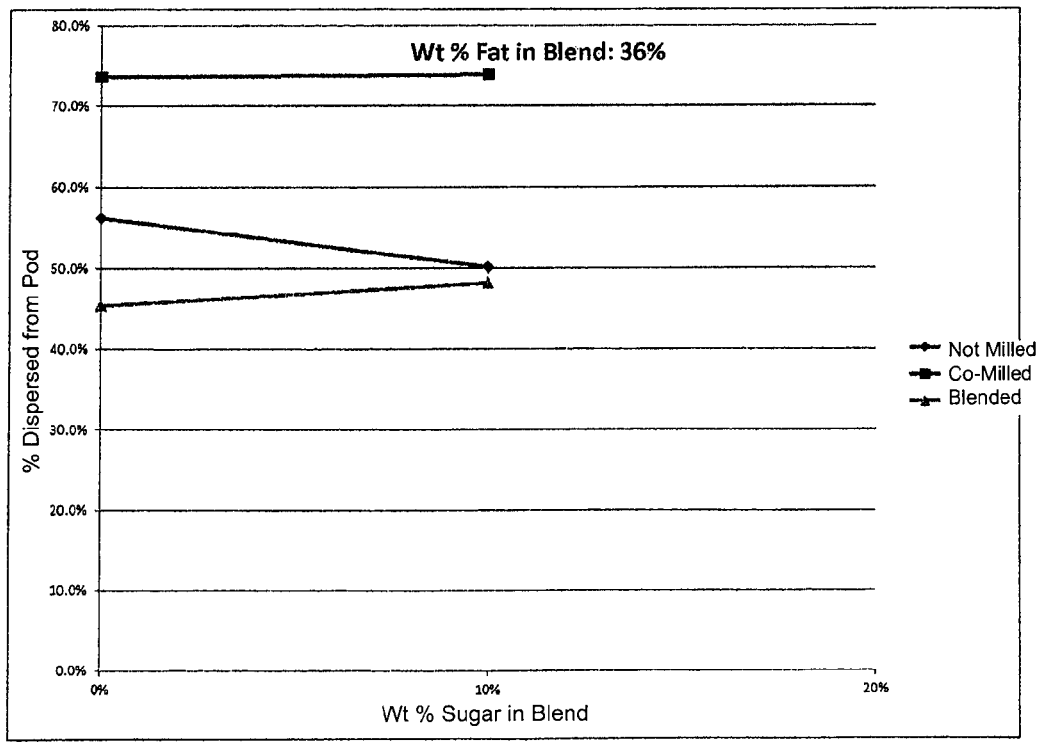

As shown in FIGS. 9A and 9B, when the powder includes 0 or 2% fat, as the amount of sugar increases, the co-milled powders tended to provide at least about 20% improved extraction over the not milled powders, and at least about 30% improved extraction over the blended powders. On the other hand, where the powders include between about 4% fat by weight and about 16% fat by weight, the co-milled powders exhibit between about 10 to about 50% improved extraction over the not milled powders and between about 10 to about 65% improved extraction over the blended powders. Even in the samples containing 24%, 32% and 36% fat, the co-milled powders typically exhibited at least about a 10% improvement in extraction from the pod compared to both the not milled and the blended samples.

Similarly, FIGS. 10A to 10C illustrate the same data but plot the increasing amount of fat in the composition against the percentage of powder that was extracted from the pod. The data shows that powders containing at least a small amount of sugar or fat exhibit superior extraction and dispersion properties than the comparative not milled or blended samples. FIG. 10A shows that even at 0 weight percent sugar, the co-milled powders exhibit better dispersion qualities than either of the other comparative powders at fat contents of between just 1-2 weight percent fat. In general, the co-milled samples exhibited about a 10 to about a 50% improvement in dispersion over the not milled powders and about a 10 to about a 70% improvement over the blended powders for all powders formulations containing at least a small amount of sugar or fat.

It was further observed during brewing that samples from the co-milled powders were consistently milk like, were stable from settling over the course of several hours (e.g., they remained milky), and had considerable foam. Overall the product in cup was consistent with steamed milk and without the need to stir. As the graphs indicate, for all samples, the co-milled powders disperse from the Disc significantly more for all conditions. Sugar and/or fat are effective agents to boost the co-milled performance.

Additional samples were compared to measure ranges of total dispersed solids into cup. Using the same brew profile, large pods were used with powder charges in the range of 15 to 20 grams. Up to 13 wt % solids were achieved with no changes in a Tassimo Disc configuration. Since the limit in this case is the size of the Disc (and not attempting powder compaction), for other formats or redesigned pods, significantly higher solids delivery should be possible.

Example 9

This Example tested a co-milled powder in single serve beverage systems including the TASSIMO® machine and a coffee machine suitable for soft filter-paper pods. In the TASSIMO® machine, the product is held in a plastic disc or cartridge or (e.g., a T-Disc). In the filter-paper pod coffee machine the product is held within a filter paper pod and water is dispensed based on the user preference for 1 cup (generally 125 ml/application) or 2 cups (generally 250 mL/application). Discs were brewed with about 200 mL of water at about 94° F. in about 26 seconds.

Co-milling was done using a jet-mill (Fluid Energy, Bethlehem, Pa.) similar to Example 8. The particle sizes reported in this Example are the d90 value. The particle size testing was done using laser diffraction (Sympatec Helos, Sympatec Clausthal-Zellerfeld, Germany).

In this example, a blend of 40% cream powder (MELO-CREME, 41.7% fat, Kerry Ingredients & Flavours, Jackson, Wis.), 30% low heat non-fat dry milk (Dairy America, Fresno, Calif.), and 30% granulated cane sugar was co-milled in the jet mill to produce a powder composition with a particle size of about 33 um. The co-milled blend was separately added to and brewed from both a Disc and Pod using the appropriate brewer machine described above. This blend dispersed well from both the Pod and the Disc. Both delivery systems had almost a complete extraction of the powder from the respective housing type to the cup.

In contrast, testing the same formulation of about 40% cream powder, about 30% low heat non-fat dry milk, and about 30% sugar blend that was not jet-milled had very little extraction from a Pod. Thus, the co-milling was successful in enabling the powder dispersion from the Pod.

The following table provides the weight percent of various powder formulations that were co-milled in this Example and the following Examples 10-18. Examples 16 and 17 each included two different powders that were layered within a pod, which explains why the total weight percentage of ingredients for these examples equals 200%. These Examples are further explained below.

from the pod. The co-milled blend had a significant improvement in extraction when compared to the same formulation that was non jet-milled where most of the powder was left in the Pod after extraction. This blend was also tested in a Disc, and the sample had a high level of extraction.

Example 11

This Example used the same general procedure for preparing and sampling the powders as Example 9. Whole milk powder or WMP (30% fat, Foster Farms, Modesto, Calif.) was blended with sugar in a ratio of 60% WMP to 40% sugar (w/w %). The blend was co-milled to a particle size of about 45 um. The blend was added to a Pod and the powder extracted using the appropriate brewer. Although the extraction was observed to not be as complete in this Example as the previous runs, the milk powder blend was substantially extracted from the Pod. It demonstrates that a co-milled whole milk powder and sugar blend could be extracted from a Pod.

Example 12

This comparative Example used the same general procedure for preparing and sampling the powders as Example 9. Low heat nonfat dry milk (Dairy America, Fresno, Calif.) was blended with 0.5% powdered lecithin (Cargill, Inc., Decatur, Ill.). The blend was co-milled to a particle size of about 14 um and brewed in a Pod. The powder did not extract well and most of the powder remained in the Pod. Despite the small particle size, the lipid content in the blend was not high enough to achieve the dispersive benefits found with co-milling.

Example 13

This Example used the same general procedure for preparing and sampling the powders as Example 9. Dark chocolate powder was produced by co-milling about 46% cocoa nibs with about 54% granulated cane sugar to a particle size of about 25 um. The powder was added to a Pod and Disc. When the Pod was brewed in an appropriate machine, most of the powder was extracted, but it was not a complete extraction. In this Example, brewing using the Disc was more successful and almost all of the powder exited into the cup in the form of a dissolved liquid. In this Example, the difference in housing type and configuration affected the amount of powder that was able to exit the Pod or Disc.

| Ex. | NFDM | Cream Powder | Sugar | WMP | Lecithin | Cocoa Nibs | Sweet Whey | Roast Coffee Beans | Soluble Coffee | Hibiscus Flowers |
|---|---|---|---|---|---|---|---|---|---|---|
| 9 | 30 | 40 | 30 | | | | | | | |
| 10 | | 40 | 60 | | | | | | | |
| 11 | | | 40 | 60 | | | | | | |
| 12 | 99.5 | | | | 0.5 | | | | | |
| 13 | | | 54 | | | 46 | | | | |
| 14 | 16.4 | | 59.6 | | | 13.4 | 10.53 | | | |
| 15 | | | | | | | | 50 | 50 | |
| 16 | 30 | 40 | 30 | | | | | 50 | 50 | |
| 17 | | | 54 | | | 46 | | 50 | 50 | |
| 18 | | | | | | | | | | 100 |

Example 10

This Example used the same general procedure for preparing and sampling the powders as Example 9. Cream powder was blended with granulated cane sugar and co-milled using the same mil as Example 9 to a particle size of about 20 um. The ratio of the ingredients was about 40% cream powder to about 60% sugar (w/w %). The powders were tested in a Pod, and there was a high level extraction

Example 14

This Example used the same general procedure for preparing and sampling the powders as Example 9. Milk chocolate powder was produced by co-milling about 13.4% cocoa nibs, about 59.6% granulated cane sugar, about 10.5% sweet whey (Leprino Foods, Denver, Colo.) and about 16.4% non-fat dry milk (Dairy America, Fresno, Calif.) to a particle size of about 25 um. The powder was added to Disc, and after the addition of the hot water, all of the powder dissolved. Almost all of the powder exited into the cup in the form of a dissolved liquid.

Example 15

This Example used the same general procedure for preparing and sampling the powders as Example 9. Roasted coffee beans were co-milled with spray-dried soluble coffee in a 50/50% ratio using the jet mill to a particle size of about 29 um. The co-milled blend was added to a Pod. A desirable flavor was found using about 5 g of the blend within the Pod. This allowed for about a 29.6% reduction in product needed within a Pod as compared to a commercial roast and ground coffee Pod. The coffee blend had a much stronger coffee impact than using about 7 g of only roast and ground coffee. It was also noted that the coffee blend extraction also had a cream on top of the coffee cup which a commercial Pod does not necessarily exhibit.

Example 16

This Example used the same general procedure for preparing and sampling the powders as Example 9. Additional portions of the same sample of the jet-milled coffee blend (50% R&G/50% Spray dried soluble) from Example 15 were layered in a pod with additional samples of the jet-milled milk powder blend (40% cream powder, 30% NFDM, and 30% granulated cane sugar) referred to in Example 9. The milk powders are soluble in warm water but in earlier examples, only partial dispersion was exhibited from the Pod. One attempt at achieving a higher level of dispersion of the milk power blend in the Pod was achieved by the addition of layering the coffee powder blend on top of the milk powder blend. When placed into a coffee machine, the coffee powder within the Pod was on the side closest to the distribution disk. It is believed that the coffee powder helps to distribute the water within the lower milk powder Pod. This layering effect may increase the hydration of the milk powder blend. In this Example, it is worthwhile to note that all of the milk powder was dispersed from the Pod. The coffee is extracted and the milk power is dispersed from the Pod creating a cup of coffee with lightener. The above mentioned combinations were made by layering the jet-milled powders within a single Pod. The pod was brewed using a 2-pod holder.

In addition to layering both powders within a single pod, it was successfully demonstrated that keeping each powder within its own Pod and then stacking individual pods also gave beneficial dispersion results. An successful example of this was demonstrated when a Pod of the jet-milled milk powder blend was stacked on top of a Pod (commercially available roast and ground coffee pod) in a 2-pod holder of the coffee machine. For the best extraction, the Pods are stacked such that the coffee Pod is closest to the metal distribution disk. Again, it is believed that the coffee Pod aids in dispersing the water and allowing it to spread out and filter more evenly through the second or milk powder Pod. Complete dispersion of the milk powder blend was exhibited using this technique.

Example 17

This Example used the same general procedure for preparing and sampling the powders as Example 16. Additional portions of the sample of the jet-milled coffee blend (50% R&G/50% Spray dried soluble) were layered in a pod with additional samples of the jet-milled dark chocolate powder to create a blended beverage. The chocolate powders are soluble in warm water but in earlier examples, only partial dispersion was exhibited from the Pod. One attempt at achieving a higher level of dispersion of the chocolate powder blend in the Pod was achieved by the addition of layering the coffee powder blend on top of the chocolate powder. When placed into the coffee machine, the coffee powder within the Pod was on the side closest to a distribution disk. It is believed that the coffee powder helps to distribute the water within the chocolate Pod. This layering effect may increase the hydration of the chocolate powder blend. In this Example, it is also worthwhile to note that all of the chocolate powder was dispersed from the Pod. The coffee is extracted and the chocolate power is dispersed from the Pod creating a mocha-type beverage that is achieved using chocolate powder rather than artificial flavorings. All of the above mentioned combinations were made by layering the jet-milled powders within a single Pod. The Pod was brewed using a 2-pod holder of a coffee machine.

In addition to layering both powders within a single pod, it was successfully demonstrated that keeping each powder within its own Pod and then stacking individual pods gave beneficial dispersion results similar to Example 16. An successful example of this was demonstrated when a Pod of the jet-milled dark chocolate powder was stacked on top of a coffee Pod (commercially available roast and ground coffee pod) in a 2-pod holder of a coffee machine. For the optimal extraction, the Pods must be stacked such that the coffee pod is closest to the metal distribution disk. Again, it is believed that the coffee pod aids in dispersing the water and allowing it to spread out and filter more evenly through the second Pod. Complete dispersion of the dark chocolate blend was exhibited using this technique.

Example 18

This comparative Example used the same general procedure for preparing and sampling the powders as Example 9. Dried hibiscus flowers were ground to about 27 microns and tested within a Pod. In contrast to the previous examples where the powders dissolved, the powdered hibiscus flowers did not dissolve. Despite the small particle size, only minimal extraction of the powder took place (noted by an observed pale color of the beverage). The powder was not able to escape from the Pod and the beverage was very weakly flavored. Inside the pod, the powder was hydrated on the surface, but it did not penetrate through the entire powder.

Example 19

Figure 11:
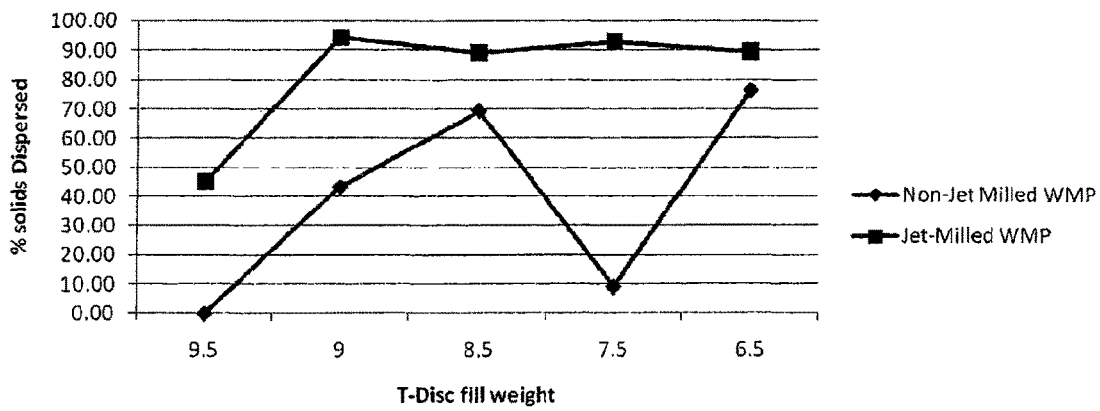
FIG. 11 is a graph illustrating the amount of a co-milled powdered composition that was extracted from T-discs at different fill weights of the disc for compositions that were both co-milled and non-jet milled.

Sample powders were formed with whole milk powder (WMP) containing 26% fat. One set of sample powders was co-milled in a jet mill. The other set of WMP samples was not jet milled to provide a benchmark for comparison. The samples were filled into a Tassimo T-disc at various different fill weights. The samples were brewed in a Tassimo Brewpot. The amount of solids remaining in the T-disc was measured to determine the percentage of the powder that was extracted from the T-disc. The jet-milled powders exhibited superior dispersion and extraction from the T-disc compared to the non-jet milled samples at all fill levels. The T-discs filled with the jet-milled samples between 6.5 and 9 grams provided about 90% extraction. The jet-milled samples showed the greatest extraction benefits compared to the non-jet milled samples at the higher fill levels of 9 and 9.5 g where they exhibited nearly a 50% improvement in extraction over the non-jet milled samples. FIG. 11 illustrates the percentage of the total solids that were extracted from the T-discs at different fill weights for both the non-jet milled and jet-milled samples.

Example 20

Figure 12:
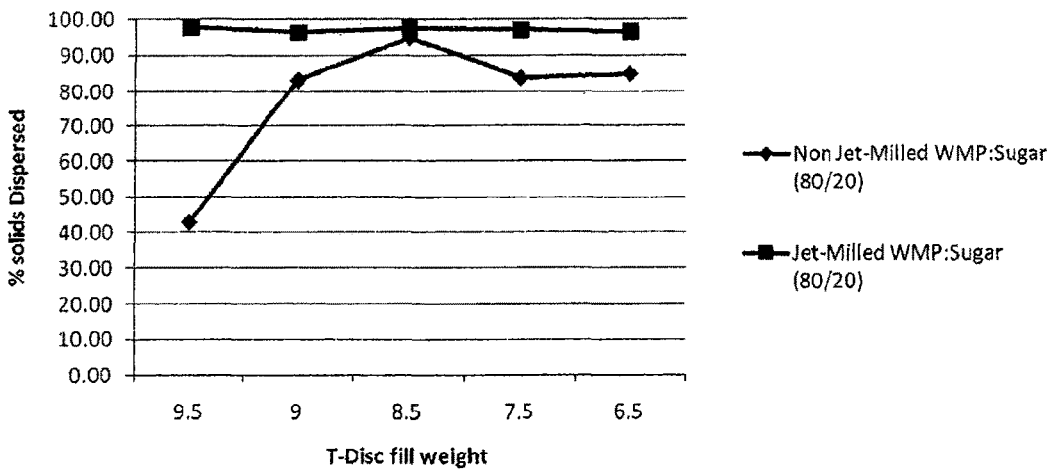
FIG. 12 is a graph illustrating the amount of a different co-milled powdered composition that was extracted from T-discs at different fill weights of the disc for compositions that were both co-milled and non-jet milled.

Sample powders were prepared from, 80% whole milk powder (WMP) containing 26% fat and 20% sugar similar to Example 19 above. One set of sample powders was co-milled in a jet mill. The other set of WMP samples was not jet milled to provide a benchmark for comparison. The samples were filled into a Tassimo T-disc at different fill weights between 6.5 and 9.5 g. The samples were brewed in a Tassimo Brewpot. The amount of solids remaining in the T-disc was measured to determine the percentage of the powder that was extracted from the T-disc. The jet-milled powders exhibited uniformly superior dispersion and extraction from the T-disc compared to the non-jet milled samples at all fill levels and greater than about 95% extraction was achieved. FIG. 12 illustrates the percentage of the total solids that were extracted from the T-discs at different fill weights for both the non-jet milled and jet-milled samples.

Example 21

Figure 13:
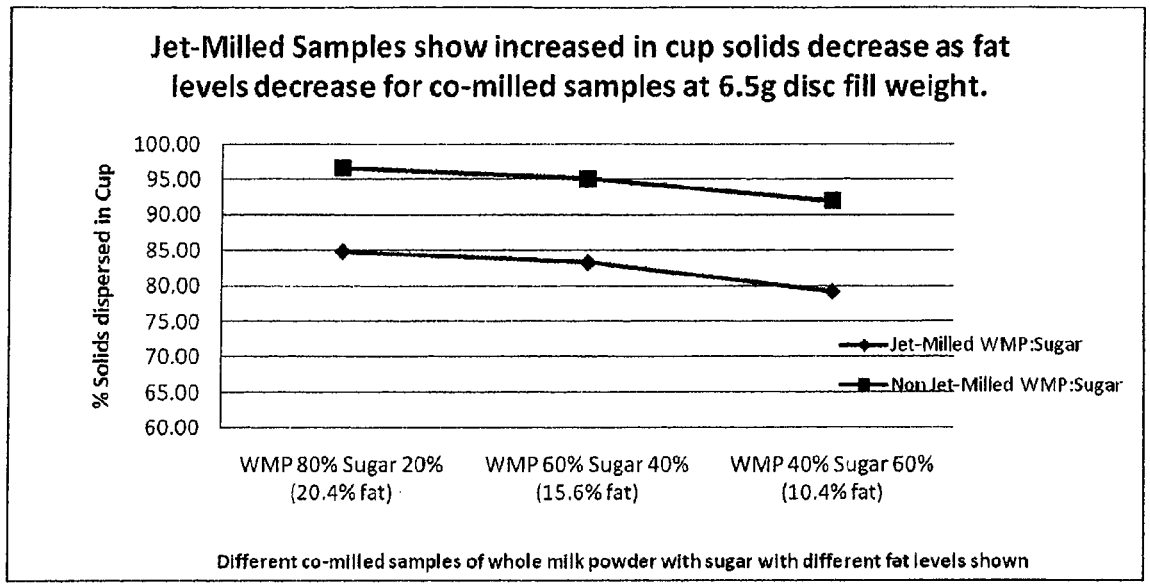
FIG. 13 is a graph illustrating the amount of co-milled powdered composition that was extracted from, T-discs at different compositions of whole milk powder and sugar for compositions that were both co-milled and non-jet milled.

Sample powders were prepared from different combinations of whole milk powder and sugar. One set of sample powders were co-milled in a jet mill. The other set of sample powders was not jet milled to provide a benchmark for comparison. The samples were filled into a Tassimo T-disc at a uniform fill weight of 6.5 g. The samples were brewed in a Tassimo Brewpot. The amount of solids remaining in the T-disc was measured to determine the percentage of the powder that was extracted from the T-disc. The jet-milled powders exhibited uniformly superior dispersion and extraction from the T-disc (approximately 10% increase in extraction) compared to the non-jet milled samples for each of the formulations. The formulations with a greater weight percentage of WMP, and thus a greater amount of fat, provided beneficial extraction properties compared to the lower fat content samples. FIG. 13 below illustrates the percentage of the total solids that were extracted from the T-discs for the different formulations for both the non-jet milled and jet-milled samples.

Example 22

Figure 14:
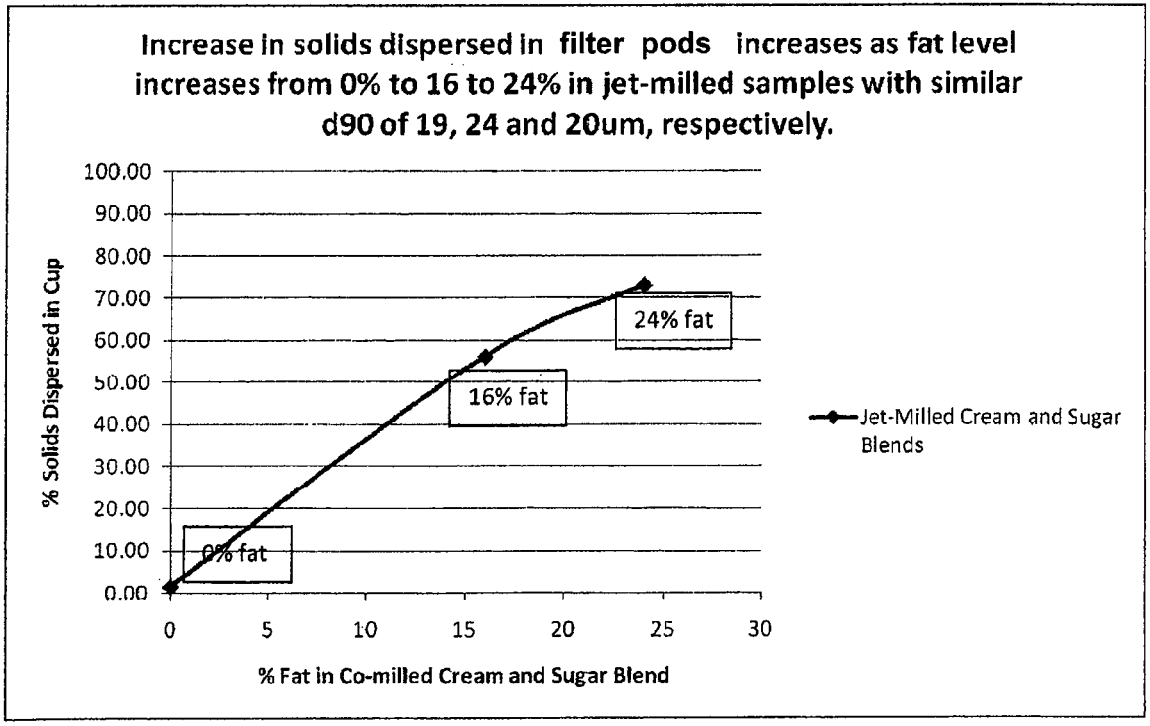
FIG. 14 is a graph illustrating the amount of co-milled powdered composition that was extracted from pods at different compositions of whole milk powder and sugar for compositions that were co-milled.

Sample powders were prepared from different combinations of cream powder and granular cane sugar. The samples included either 0%, 16%, and 24% fat. The powders were co-milled in a jet mill to similar d90 particle sizes of between about 19 and 24 microns. The samples were filled into Pods at uniform fill weights. The samples were brewed in a coffee machine. The amount of solids remaining in the Pods was measured to determine the percentage of the powder that was extracted from the Pod. The formulations with a greater weight percentage of cream powder, and thus a greater amount of fat provided beneficial extraction characteristics compared to the lower fat content samples. FIG. 14 illustrates the percentage of the total solids that were extracted from the Pod for the different formulations for both the non-jet milled and jet-milled samples.

Example 23

Figure 15:
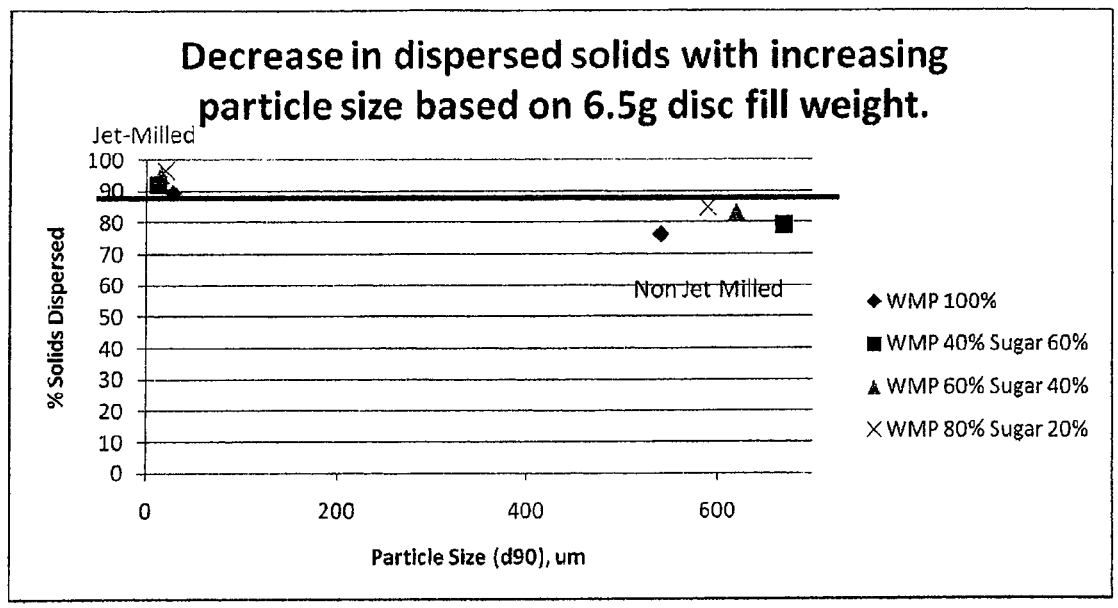
FIG. 15 is a graph illustrating the amount of co-milled powdered composition that was extracted from T-discs at different compositions of whole milk powder and sugar at different particle sizes for compositions that were both co-milled and non-jet milled.

Sample powders were prepared from different combinations of whole milk powder and granular cane sugar. One set of sample powders was co-milled in a jet mill to a d90 particle size of less than about 50 microns. The other set of sample powders was not jet milled and the d90 particle size was measured to be between about 500 to 700 microns. The samples were filled into a Tassimo T-disc at a uniform fill weight of 6.5 g. The samples were brewed in a Tassimo Brewpot. The amount of solids remaining in the T-disc was measured to determine the percentage of the powder that was extracted from the T-disc. The jet-milled powders exhibited uniformly superior dispersion and extraction from the T-disc compared to the non-jet milled samples for each of the formulations. Each of the jet-milled samples provided above about 88% extraction from the T-disc. Each of the non-jet milled samples exhibited below 88% extraction from the T-disc. FIG. 15 illustrates the percentage of the total solids that were extracted from the T-discs for the different formulations for both the non-jet milled and jet-milled samples.

It will be understood that various changes in the details, materials, and arrangements of the process, formulations, and ingredients thereof, which have been herein described and illustrated in order to explain the nature of the method and resulting powders, may be made by those skilled in the art within the principle and scope of the embodied method.

What is claimed is:

1. A method for forming a beverage for consumption by a consumer from a co-milled powdered composition, the method comprising:
    co-milling together at least one powdered ingredient having a difficult to disperse portion thereof with about 2 to about 90 percent of one or more dispersion facilitator components to form a co-milled powdered composition with a particle size of about 100 to about 150 microns; and
    combining the co-milled powdered composition with the particle size of about 100 to about 150 microns with a fluid to produce the beverage for consumption by the consumer with about 2 to about 16 percent solids from the co-milled powdered composition dispersed in the beverage for consumption by the consumer.

2. The method of claim 1, wherein the at least one powdered ingredient is selected from the group consisting of non fat dry milk powder, whole milk powder, roast and ground coffee, cocoa powder, cream powder and mixtures thereof and the difficult to disperse portion thereof is selected from the group consisting of non-fat dairy solids, non-soluble cocoa solids, non-soluble coffee solids, and mixtures thereof.

3. The method of claim 1, wherein the dispersion facilitator component is selected from the group consisting of lipid, dairy fat, sugar, salt, and mixtures thereof.

4. The method of claim 1, wherein the co-milled powdered composition includes about 2 to about 40 percent dairy fat as the dispersion facilitator component.

5. The method of claim 1, wherein the co-milled powdered composition includes about 2 to about 80 percent sugar as the dispersion facilitator component.

6. The method of claim 1, wherein the co-milled powdered composition includes non-fat dry milk powder, cream powder, and optionally sugar.

7. The method of claim 1, wherein the beverage for consumption by the consumer is substantially free of starches, flow aids, and emulsifiers selected from the group comprising cellulose, corn starch, lecithin, modified starches, and mixtures thereof.

8. The method of claim 7, wherein the beverage for consumption by the consumer has less than about 0.5% of each of the starches, flow aids, emulsifiers, and mixtures thereof.

9. The method of claim 1, wherein the amount of co-milled powdered composition per gram of fluid ranges from about 0.05 grams of powdered composition per gram of water to about 0.5 grams of powdered composition per gram of water.

10. The method of claim 1, wherein the co-milled powdered composition is provided in a single-serve pod or cartridge for use with a beverage brewing machine.

11. A method for forming a food product for consumption by a consumer from a co-milled powdered composition, the method comprising:

co-milling together at least one powdered ingredient having a difficult to disperse portion thereof with about 2 to about 90 percent of one or more dispersion facilitator components to form a co-milled powdered composition with a particle size of about 100 to about 150 microns; and combining the co-milled powdered composition with the particle size of about 100 to about 150 microns with a fluid to produce the food product for consumption by the consumer with about 2 to about 16 percent solids from the co-milled powdered composition dispersed in the food product for consumption by the consumer.

\* \* \* \* \*